(12) United States Patent
Adachi

(10) Patent No.: US 7,333,666 B2
(45) Date of Patent: Feb. 19, 2008

(54) DIGITAL MAP SHAPE VECTOR ENCODING METHOD AND POSITION INFORMATION TRANSFER METHOD

(75) Inventor: Shinya Adachi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 265 days.

(21) Appl. No.: 10/169,705

(22) PCT Filed: Apr. 26, 2002

(86) PCT No.: PCT/JP02/04267

§ 371 (c)(1),
(2), (4) Date: Sep. 13, 2002

(87) PCT Pub. No.: WO02/091587

PCT Pub. Date: Nov. 14, 2002

(65) Prior Publication Data

US 2003/0093221 A1    May 15, 2003

(30) Foreign Application Priority Data

May 1, 2001    (JP)    .............................. 2001-134318
Jul. 19, 2001    (JP)    .............................. 2001-220061

(51) Int. Cl.
*G06K 9/36*    (2006.01)
(52) U.S. Cl. ...................... 382/243; 382/245; 701/208; 340/995.1
(58) Field of Classification Search ........ 382/241–243, 382/244–247, 268, 291, 104, 113, 197, 199, 382/201, 203; 345/441–443; 701/200, 207–210; 340/990, 995.1, 995.12, 995.13
See application file for complete search history.

(56) References Cited

U.S. PATENT DOCUMENTS

| 4,807,127 A | 2/1989 | Tenmoku et al. |
| 4,819,175 A | 4/1989 | Wuttke |
| 4,893,246 A | 1/1990 | Iihoshi et al. |

(Continued)

FOREIGN PATENT DOCUMENTS

EP    0 875 877 A2    11/1998

(Continued)

OTHER PUBLICATIONS

Philomin et al., "Pedestrian tracking from a moving vehicle," IEEE, 2000, pp. 1-6.*

(Continued)

*Primary Examiner*—Samir Ahmed
(74) *Attorney, Agent, or Firm*—Pearne & Gordon LLP

(57) ABSTRACT

It is an object to provide a method of coding the position information of a digital map in a small data volume by utilizing a compressing and coding technique. In a coding method of coding data indicative of a shape vector on a digital map, an arithmetic processing is carried out over position information about a node string and a shape which indicate the shape vector to be represented by data having a statistical deviation, and the data having the statistical deviation are coded to reduce a data volume. It is possible to considerably decrease a transmission data volume in the case in which the vector shape of the digital map is to be transferred.

3 Claims, 36 Drawing Sheets

U.S. PATENT DOCUMENTS

| | | | |
|---|---|---|---|
| 4,924,699 A | 5/1990 | Kuroda et al. | |
| 4,930,888 A | 6/1990 | Freisleben et al. | |
| 4,963,864 A | 10/1990 | Iihoshi et al. | |
| 4,963,865 A | 10/1990 | Ichikawa et al. | |
| 4,984,168 A | 1/1991 | Neukrichner et al. | |
| 5,040,122 A | 8/1991 | Neukirchner et al. | |
| 5,046,011 A | 9/1991 | Kakihara et al. | |
| 5,067,082 A | 11/1991 | Nimura et al. | |
| 5,214,757 A | 5/1993 | Mauney et al. | |
| 5,307,278 A | 4/1994 | Hermans et al. | |
| 5,311,195 A | 5/1994 | Mathis et al. | |
| 5,345,388 A | 9/1994 | Kashiwazaki | 701/213 |
| 5,410,346 A * | 4/1995 | Saneyoshi et al. | 348/116 |
| 5,442,559 A | 8/1995 | Kuwahara et al. | |
| 5,488,559 A | 1/1996 | Seymour | |
| 5,742,923 A | 4/1998 | Odagawa | |
| 5,839,087 A | 11/1998 | Sato | |
| 5,862,511 A | 1/1999 | Croyle et al. | |
| 5,899,954 A | 5/1999 | Sato | |
| 5,908,466 A | 6/1999 | Veugen et al. | |
| 5,948,043 A | 9/1999 | Mathis | |
| 5,995,023 A | 11/1999 | Kreft | |
| 6,002,981 A | 12/1999 | Kreft | |
| 6,035,253 A | 3/2000 | Hayashi et al. | |
| 6,038,559 A | 3/2000 | Ashby et al. | |
| 6,061,627 A | 5/2000 | Sato | |
| 6,108,603 A | 8/2000 | Karunanidhi | |
| 6,115,668 A | 9/2000 | Kaneko et al. | |
| 6,188,959 B1 | 2/2001 | Schupfner | |
| 6,223,124 B1 * | 4/2001 | Matsuno et al. | 701/209 |
| 6,230,100 B1 | 5/2001 | Geier | |
| 6,240,368 B1 | 5/2001 | Kreft | |
| 6,324,468 B1 | 11/2001 | Meis et al. | 701/202 |
| 6,333,703 B1 | 12/2001 | Alewine et al. | 340/995.13 |
| 6,334,089 B2 | 12/2001 | Hessing | |
| 6,345,229 B1 | 2/2002 | Honkomp et al. | |
| 6,424,904 B1 * | 7/2002 | Takahashi et al. | 701/70 |
| 6,687,611 B1 * | 2/2004 | Hessing et al. | 701/208 |
| 6,741,752 B1 * | 5/2004 | Yang | 382/268 |
| 6,876,773 B2 * | 4/2005 | Mizuno et al. | 382/243 |
| 2001/0001847 A1 | 5/2001 | Hessing | |
| 2001/0007088 A1 | 7/2001 | Winter et al. | 701/208 |
| 2001/0012981 A1 | 8/2001 | Yamashita et al. | |
| 2001/0016796 A1 | 8/2001 | Ata et al. | |
| 2001/0037177 A1 | 11/2001 | Nishida et al. | |

FOREIGN PATENT DOCUMENTS

| | | |
|---|---|---|
| EP | 1 022 578 A2 | 7/2000 |
| EP | 1 098 168 A2 | 5/2001 |
| EP | 1 102 036 A1 | 5/2001 |
| JP | 11-214068 | 7/1999 |
| JP | 11-242166 | 8/1999 |
| JP | 2001-41757 | 2/2001 |
| JP | 2001-41757 A | 2/2001 |
| JP | 2001-0066145 * | 3/2001 |
| JP | 2001-066145 * | 3/2001 |
| JP | 2001-0066146 * | 3/2001 |
| JP | 2001-66146 | 3/2001 |
| JP | 2001-066146 * | 3/2001 |
| JP | 2001-66146 A | 3/2001 |
| JP | 2002-213980 A | 7/2002 |
| WO | WO 98/27530 | 6/1998 |
| WO | WO 98/45724 | 10/1998 |
| WO | WO 99/24787 | 5/1999 |
| WO | WO 99/56081 | 11/1999 |
| WO | WO 99/56264 | 11/1999 |
| WO | 00/08616 | 2/2000 |
| WO | WO 00/49530 | 8/2000 |
| WO | WO 00/50845 | 8/2000 |
| WO | 01/18768 A1 | 3/2001 |
| WO | 01/18769 A1 | 3/2001 |
| WO | WO 01/50089 A1 | 7/2001 |
| WO | WO 01/50437 A1 | 7/2001 |
| WO | WO 01/75838 A1 | 10/2001 |
| WO | WO 01/84081 A1 | 11/2001 |
| WO | WO 02/04894 A1 | 1/2002 |
| WO | WO 02/14788 A1 | 2/2002 |
| WO | WO 02/16874 A1 | 2/2002 |

OTHER PUBLICATIONS

Eakins et al., "Evalluation of a trademark image retrieval system," Electronic Workshops in Computing, 1997, pp. 1-10.*
Myron Flickner, et al., "Periodic Quasi-Orthogonal Spline Bases and Applications to Least-Squares Curve Fitting of Digital images", IEEE Transaction on Image Processing, vol. 5, No. 1, pp. 71-88, Jan. 1996.*
Abstract of U.S. Patent No. 4,040,740: Date issued: Aug. 1977.
Abstract of U.S. Patent No. 4,063,237: Date issued: Dec. 1977.
Abstract of U.S. Patent No. 4,151,656: Date issued: May 1979.
Abstract of U.S. Patent No. 4,196,474: Date issued: Apr. 1980.
Abstract of U.S. Patent No. 4,251,797: Date issued: Feb. 1981.
Abstract of U.S. Patent No. 4,304,487: Date issued: Dec. 1981.
Abstract of U.S. Patent No. 4,725,957: Date issued: Feb. 1988.
Abstract of U.S. Patent No. 4,728,888: Date issued: Mar. 1988.
Abstract of U.S. Patent No. 4,729,172: Date issued: Mar. 1988.
Abstract of U.S. Patent No. 4,731,727: Date issued: Mar. 1988.
Abstract of U.S. Patent No. 4,733,179: Date issued: Mar. 1988.
Abstract of U.S. Patent No. 4,782,453: Date issued: Nov. 1988.
Abstract of U.S. Patent No. 4,784,237: Date issued: Nov. 1988.
Abstract of U.S. Patent No. 4,807,264: Date issued: Feb. 1989.
Abstract of U.S. Patent No. 4,835,870: Date issued: Jun. 1989.
Abstract of U.S. Patent No. 4,989,333: Date issued: Feb. 1991.
Abstract of U.S. Patent No. 5,020,143: Date issued: May 1991.
Abstract of U.S. Patent No. 5,021,962: Date issued: Jun. 1991.
Abstract of U.S. Patent No. 5,059,965: Date issued: Oct. 1991.
Abstract of U.S. Patent No. 5,095,532: Date issued: Mar. 1992.
Abstract of U.S. Patent No. 5,146,219: Date issued: Sep. 1992.
Abstract of U.S. Patent No. 5,148,604: Date issued: Sep. 1992.
Abstract of U.S. Patent No. 5,173,691: Date issued: Dec. 1992.
Abstract of U.S. Patent No. 5,177,685: Date issued: Jan. 1993.
Abstract of U.S. Patent No. 5,182,555: Date issued: Jan. 1993.
Abstract of U.S. Patent No. 5,184,123: Date issued: Feb. 1993.
Abstract of U.S. Patent No. 5,193,214: Date issued: Mar. 1993.
Abstract of U.S. Patent No. 5,247,252: Date issued: Sep. 1993.
Abstract of U.S. Patent No. 5,261,279: Date issued: Nov. 1993.
Abstract of U.S. Patent No. 5,279,040: Date issued: Jan. 1994.
Abstract of U.S. Patent No. 5,283,575: Date issued: Feb. 1994.
Abstract of U.S. Patent No. 5,332,180: Date issued: Jul. 1994.
Abstract of U.S. Patent No. 5,351,539: Date issued: Oct. 1994.
Abstract of U.S. Patent No. 5,396,429: Date issued: Mar. 1995.
Abstract of U.S. Patent No. 5,406,490: Date issued: Apr. 1995.
Abstract of U.S. Patent No. 5,416,711: Date issued: May 1995.
Abstract of U.S. Patent No. 5,438,687: Date issued: Aug. 1995.
Abstract of U.S. Patent No. 5,440,389: Date issued: Aug. 1995.
Abstract of U.S. Patent No. 5,465,088: Date issued: Nov. 1995.
Abstract of U.S. Patent No. 5,473,930: Date issued: Dec. 1995.
Abstract of U.S. Patent No. 5,487,009: Date issued: Jan. 1996.
Abstract of U.S. Patent No. 5,504,482: Date issued: Apr. 1996.
Abstract of U.S. Patent No. 5,508,917: Date issued: Apr. 1996.
Abstract of U.S. Patent No. 5,515,042: Date issued: May 1996.
Abstract of U.S. Patent No. 5,523,765: Date issued: Jun. 1996.
Abstract of U.S. Patent No. 5,602,542: Date issued: Feb. 1997.
Abstract of U.S. Patent No. 5,629,690: Date issued: May 1997.
Abstract of U.S. Patent No. 5,659,476: Date issued: Aug. 1997.
Abstract of U.S. Patent No. 5,703,293: Date issued: Dec. 1997.
Abstract of U.S. Patent No. 5,710,566: Date issued: Jan. 1998.
Abstract of U.S. Patent No. 5,736,941: Date issued: Apr. 1998.
Abstract of U.S. Patent No. 5,745,865: Date issued: Apr. 1998.
Abstract of U.S. Patent No. 5,748,107: Date issued: May 1998.
Abstract of U.S. Patent No. 5,757,285: Date issued: May 1998.
Abstract of U.S. Patent No. 5,797,112: Date issued: Aug. 1998.
Abstract of U.S. Patent No. 5,812,069: Date issued: Sep. 1998.

Abstract of U.S. Patent No. 5,826,212: Date issued: Oct. 1998.
Abstract of U.S. Patent No. 5,828,322: Date issued: Oct. 1998.
Abstract of U.S. Patent No. 5,842,146: Date issued: Nov. 1998.
Abstract of U.S. Patent No. 5,850,190: Date issued: Dec. 1998.
Abstract of U.S. Patent No. 5,905,451: Date issued: May 1999.
Abstract of U.S. Patent No. 5,926,118: Date issued: Jul. 1999.
Abstract of U.S. Patent No. 5,933,094: Date issued: Aug. 1999.
Abstract of U.S. Patent No. 5,933,100: Date issued: Aug. 1999.
Abstract of U.S. Patent No. 5,974,356: Date issued: Oct. 1999.
Abstract of U.S. Patent No. 5,977,885: Date issued: Nov. 1999.
Abstract of U.S. Patent No. 5,990,809: Date issued: Nov. 1999.
Abstract of U.S. Patent No. 5,995,023: Date issued: Nov. 1999.
Abstract of U.S. Patent No. 5,996,409: Date issued: Dec. 1999.
Abstract of U.S. Patent No. 6,006,161: Date issued: Dec. 1999.
Abstract of U.S. Patent No. 6,012,012: Date issued: Jan. 2000.
Abstract of U.S. Patent No. 6,031,600: Date issued: Feb. 2000.
Abstract of U.S. Patent No. 6,064,319: Date issued: May 2000.
Abstract of U.S. Patent No. 6,097,313: Date issued: Aug. 2000.
Abstract of U.S. Patent No. 6,104,480: Date issued: Aug. 2000.
Abstract of U.S. Patent No. 6,107,940: Date issued: Aug. 2000.
Abstract of U.S. Patent No. 6,107,941: Date issued: Aug. 2000.
Abstract of U.S. Patent No. 6,111,521: Date issued: Aug. 2000.
Abstract of U.S. Patent No. 6,111,523: Date issued: Aug. 2000.
Abstract of U.S. Patent No. 6,114,973: Date issued: Sep. 2000.
Abstract of U.S. Patent No. 6,137,564: Date issued: Oct. 2000.
Abstract of U.S. Patent No. 6,150,961: Date issued: Nov. 2000.
Abstract of U.S. Patent No. 6,163,752: Date issued: Dec. 2000.
Abstract of U.S. Patent No. 6,169,955: Date issued: Jan. 2001.
Abstract of U.S. Patent No. 6,169,956: Date issued: Jan. 2001.
Abstract of U.S. Patent No. 6,178,378: Date issued: Jan. 2001.
Abstract of U.S. Patent No. 6,192,314: Date issued: Feb. 2001.
Abstract of U.S. Patent No. 6,208,268: Date issued: Mar. 2001.
Abstract of U.S. Patent No. 6,212,473: Date issued: Apr. 2001.
Abstract of U.S. Patent No. 6,223,125: Date issued: Apr. 2001.
Abstract of U.S. Patent No. 6,230,099: Date issued: May 2001.
Abstract of U.S. Patent No. 6,232,917: Date issued: May 2001.
Abstract of U.S. Patent No. 6,236,336: Date issued: May 2001.
Abstract of U.S. Patent No. 6,236,933: Date issued: May 2001.
Abstract of U.S. Patent No. 6,240,368: Date issued: May 2001.
Abstract of U.S. Patent No. 6,244,111: Date issued: Jun. 2001.
Abstract of U.S. Patent No. 6,249,754: Date issued: Jun. 2001.
Abstract of U.S. Patent No. 6,266,609: Date issued: Jul. 2001.
Abstract of U.S. Patent No. 6,281,807: Date issued: Aug. 2001.
Abstract of U.S. Patent No. 6,281,808: Date issued: Aug. 2001.
Abstract of U.S. Patent No. 6,292,747: Date issued: Sep. 2001.
Abstract of U.S. Patent No. 6,293,024: Date issued: Sep. 2001.
Abstract of U.S. Patent No. 6,298,303: Date issued: Oct. 2001.
Abstract of U.S. Patent No. 6,321,158: Date issued: Nov. 2001.
Abstract of U.S. Patent No. 6,321,162: Date issued: Nov. 2001.
Abstract of U.S. Patent No. 6,324,467: Date issued: Nov. 2001.
Abstract of U.S. Patent No. 6,324,468: Date issued: Nov. 2001.
Abstract of U.S. Patent No. 6,324,888: Date issued: Dec. 2001.
Abstract of U.S. Patent No. 6,326,887: Date issued: Dec. 2001.
Abstract of U.S. Patent No. 6,327,532: Date issued: Dec. 2001.
Abstract of U.S. Patent No. 6,333,703: Date issued: Dec. 2001.
Abstract of U.S. Patent No. 6,334,089: Date issued: Dec. 2001.

* cited by examiner

| VALUE OF Δθ (°) | CODE | OVERHEAD BIT |
|---|---|---|
| 0 | 0 | 0 |
| ±1 | 100 | 1 (±IDENTIFICATION) |
| ±2 | 101 | 1 (±IDENTIFICATION) |
| ±3 | 1100 | 1 (±IDENTIFICATION) |
| ±4 | 1101 | 1 (±IDENTIFICATION) |
| ±5 | 1110 | 1 (±IDENTIFICATION) |
| ±6 | 11110 | 1 (±IDENTIFICATION) |
| ⋮ | ⋮ | ⋮ |

FIG. 3

| RUN-LENGTH | CODE | OVERHEAD BIT |
|---|---|---|
| 0 | 0 | – |
| 5 | 101 | – |
| 10 | 1100 | – |
| 15 | 1101 | – |
| 20 | 1110 | – |
| ⋮ | ⋮ | ⋮ |

FIG. 4

| VALUE OF Δθ (°) | CODE | OVERHEAD BIT |
|---|---|---|
| 0 | 0 | 0 |
| ±1 | 100 | 1 (±IDENTIFICATION) |
| ±2 | 101 | 1 (±IDENTIFICATION) |
| ±3 | 1100 | 1 (±IDENTIFICATION) |
| ±4 | 1101 | 1 (±IDENTIFICATION) |
| ±5 | 1110 | 1 (±IDENTIFICATION) |
| ±6 | 11110 | 1 (±IDENTIFICATION) |
| ⋮ | ⋮ | ⋮ |

FIG. 5

| INPUT VALUE | | CODE | OVERHEAD BIT |
|---|---|---|---|
| RUN-LENGTH | VALUE OF Δθ (°) | | |
| 0 | 0 | 0 | 0 |
| 5 | 0 | 100 | 0 |
| 10 | 0 | 101 | 0 |
| 15 | 0 | 1100 | 0 |
| 0 | ±1 | 1101 | 1 (±IDENTIFICATION) |
| 0 | ±2 | 1110 | 1 (±IDENTIFICATION) |
| 0 | ±3 | 11110 | 1 (±IDENTIFICATION) |
| ⋮ | ⋮ | ⋮ | ⋮ |

FIG. 9

| |
|---|
| VECTOR DATA TYPE (= ROAD) |
| CODE TABLE DATA |
| SAMPLE SECTION LENGTH L (m) |
| PRECISION INFORMATION ABOUT SHAPE ACQUISITION SOURCE MAP DATA |
| ONE-WAY DIRECTION (FORWARD/REVERSE/NONE) |
| TOTAL NUMBER OF NODES |
| NODE NUMBER p1 |
| NODE p1 X DIRECTION ABSOLUTE COORDINATE (LONGITUDE) |
| NODE p1 Y DIRECTION ABSOLUTE COORDINATE (LATITUDE) |
| NODE p1 ABSOLUTE AZIMUTH |
| CODED DATA BETWEEN NODES p1 AND p2 (BIT STRING HAVING $\Delta\theta_j$ CODED) |

| MAXIMUM POSITION ERROR OF REPRODUCED SHAPE BETWEEN p1 AND p2 (m) | MAXIMUM AZIMUTH ERROR OF REPRODUCED SHAPE BETWEEN p1 AND p2 (m) |
|---|---|

| |
|---|
| NODE NUMBER p2 |
| NODE p2 X DIRECTION RELATIVE COORDINATE (LONGITUDE) |
| NODE p2 Y DIRECTION RELATIVE COORDINATE (LATITUDE) |
| NODE p2 ABSOLUTE AZIMUTH |
| ⋮ |
| NODE NUMBER pn |
| NODE pn X DIRECTION RELATIVE COORDINATE (LONGITUDE) |
| NODE pn Y DIRECTION RELATIVE COORDINATE (LATITUDE) |
| NODE pn ABSOLUTE AZIMUTH |

FIG. 10

| |
|---|
| EVENT NUMBER (= ACCIDENT) |
| RELATED AND REGULATED INFORMATION (ONE LANE REGULATION) |
| GENERATION PLACE REFERENCE POINT NODE NUMBER (= p1) |
| DIRECTION FLAG (= FORWARD DIRECTION WITH RESPECT TO NODE STRING) |
| RELATIVE DISTANCE FROM REFERENCE POINT (m) |
| ⋮ |
| EVENT NUMBER (= TRAFFIC JAM) |
| MEAN SPEED IN TRAFFIC JAM (= 15km) |
| GENERATION PLACE REFERENCE POINT NODE NUMBER (= pj) |
| DIRECTION FLAG (= REVERSE DIRECTION TO NODE STRING) |
| RELATIVE DISTANCE FROM REFERENCE POINT (STARTING SIDE) (m) |
| RELATIVE DISTANCE FROM REFERENCE POINT (ENDING SIDE) (m) |

| CONDITION | $D_j \leq 60$ (m) | $60 < D_j \leq 120$ | $120 < D_j \leq 240$ | ······ | $3480 < D_j$ |
|---|---|---|---|---|---|
| SECTION LENGTH | 40 (m) | 80 | 160 | ······ | 5120 |

FIG. 19

| SPECIAL CODE | CODE | OVERHEAD BIT |
|---|---|---|
| SECTION LENGTH CHANGE CODE | 101 | 3 (40/80/160/ · · · /5120m) |
| REFERENCE POINT SET CODE | 111110 | 6 (REFERENCE NODE NUMBER) |
| EOD CODE | 1100 | 0 |

| INPUT VALUE | | CODE | OVERHEAD BIT | RANGE OF VALUE OF Δθ (°) |
|---|---|---|---|---|
| RUN-LENGTH | VALUE OF Δθ (°) | | | |
| 0 | 0 | 0 | 0 | -1 ~ +1 |
| 5 | 0 | 100 | 0 | -1 ~ +1 |
| 10 | 0 | 1101 | 0 | -1 ~ +1 |
| 0 | ±3 | 1111 | 1 (±IDENTIFICATION) | ±2 ~ 4 |
| 0 | ±6 | 111100 | 1 (±IDENTIFICATION) | ±5 ~ 7 |
| 0 | ±9 | 111101 | 1 (±IDENTIFICATION) | ±8 ~ 10 |
| ⋮ | ⋮ | ⋮ | ⋮ | ⋮ |

FIG. 22

| VECTOR DATA TYPE (= ROAD) |  |
|---|---|
| CODE TABLE DATA | |
| PRECISION INFORMATION ABOUT SHAPE ACQUISITION SOURCE MAP DATA | |
| ONE-WAY DIRECTION (FORWARD/REVERSE/NONE) | |
| STARTING NODE NUMBER ps | |
| NODE ps X DIRECTION ABSOLUTE COORDINATE (LONGITUDE) | |
| NODE ps Y DIRECTION ABSOLUTE COORDINATE (LATITUDE) | |
| NODE ps ABSOLUTE AZIMUTH | |
| ps POSITION ERROR (m) | ps AZIMUTH ERROR (°) |
| MAXIMUM POSITION ERROR OF CODED SHAPE DATA (m) | MAXIMUM AZIMUTH ERROR OF CODED SHAPE DATA (m) |
| CODED SHAPE DATA INCLUDING FOLLOWING INFORMATION<br><br>· $\Delta\theta$<br>· REFERENCE NODE<br>· SAMPLE SECTION LENGTH | |
| ENDING NODE NUMBER pe | |
| NODE pe X DIRECTION RELATIVE COORDINATE (LONGITUDE) | |
| NODE pe Y DIRECTION RELATIVE COORDINATE (LATITUDE) | |
| NODE pe ABSOLUTE AZIMUTH | |
| pe POSITION ERROR (m) | pe AZIMUTH ERROR (°) |

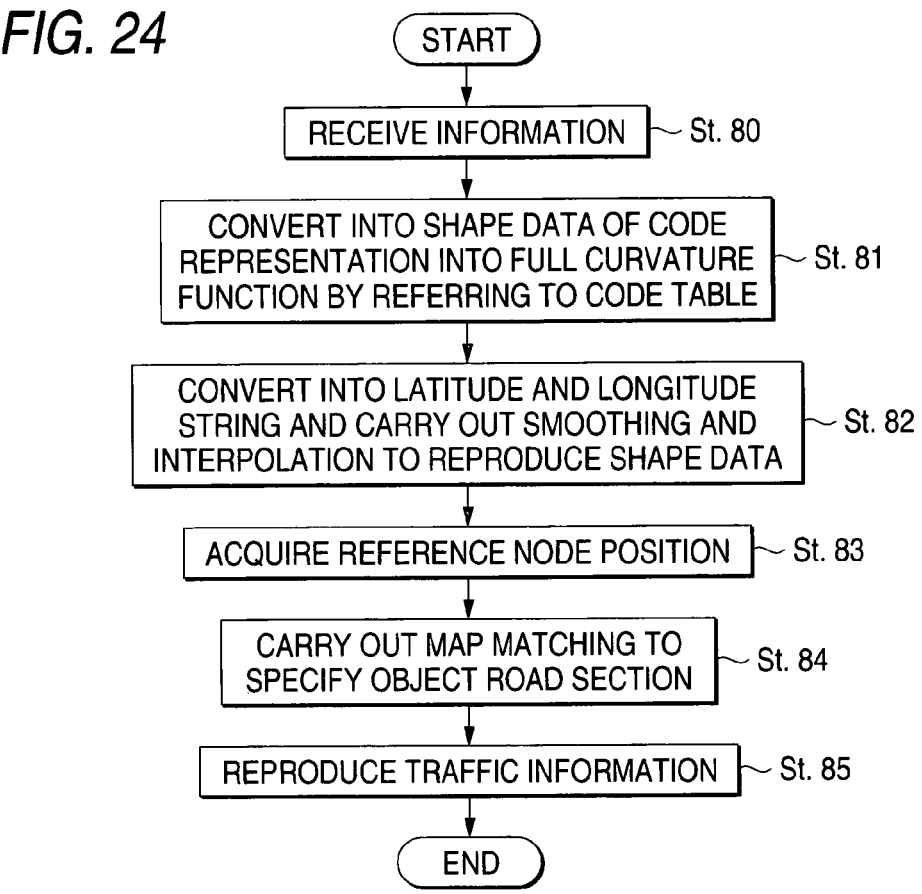
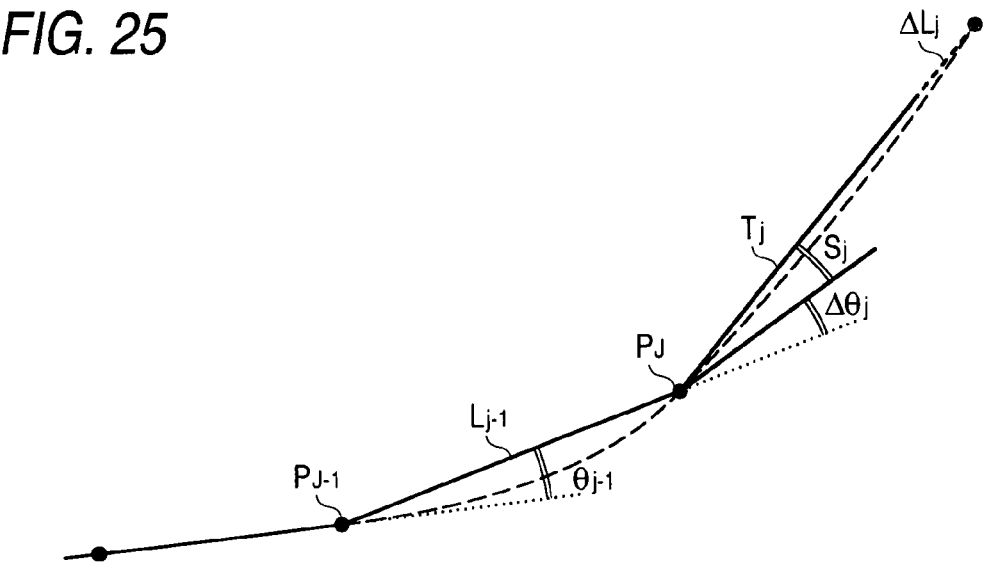

FIG. 26 (a)

| VALUE OF ΔL (x UNIT LENGTH < m >) | CODE | OVERHEAD BIT |
|---|---|---|
| 0 | 0 | 0 |
| ±1 | 100 | 1 (±IDENTIFICATION) |
| ±2 | 101 | 1 (±IDENTIFICATION) |
| ±3 | 1100 | 1 (±IDENTIFICATION) |
| ±4 | 1101 | 1 (±IDENTIFICATION) |
| ±5 | 1110 | 1 (±IDENTIFICATION) |
| ±6 | 11110 | 1 (±IDENTIFICATION) |
| ⋮ | ⋮ | ⋮ |

FIG. 26 (b)

| VALUE OF Δθ (x UNIT LENGTH < ° >) | CODE | OVERHEAD BIT |
|---|---|---|
| 0 | 0 | 0 |
| ±1 | 100 | 1 (±IDENTIFICATION) |
| ±2 | 101 | 1 (±IDENTIFICATION) |
| ±3 | 1100 | 1 (±IDENTIFICATION) |
| ±4 | 1101 | 1 (±IDENTIFICATION) |
| ±5 | 1110 | 1 (±IDENTIFICATION) |
| ±6 | 11110 | 1 (±IDENTIFICATION) |
| ⋮ | ⋮ | ⋮ |

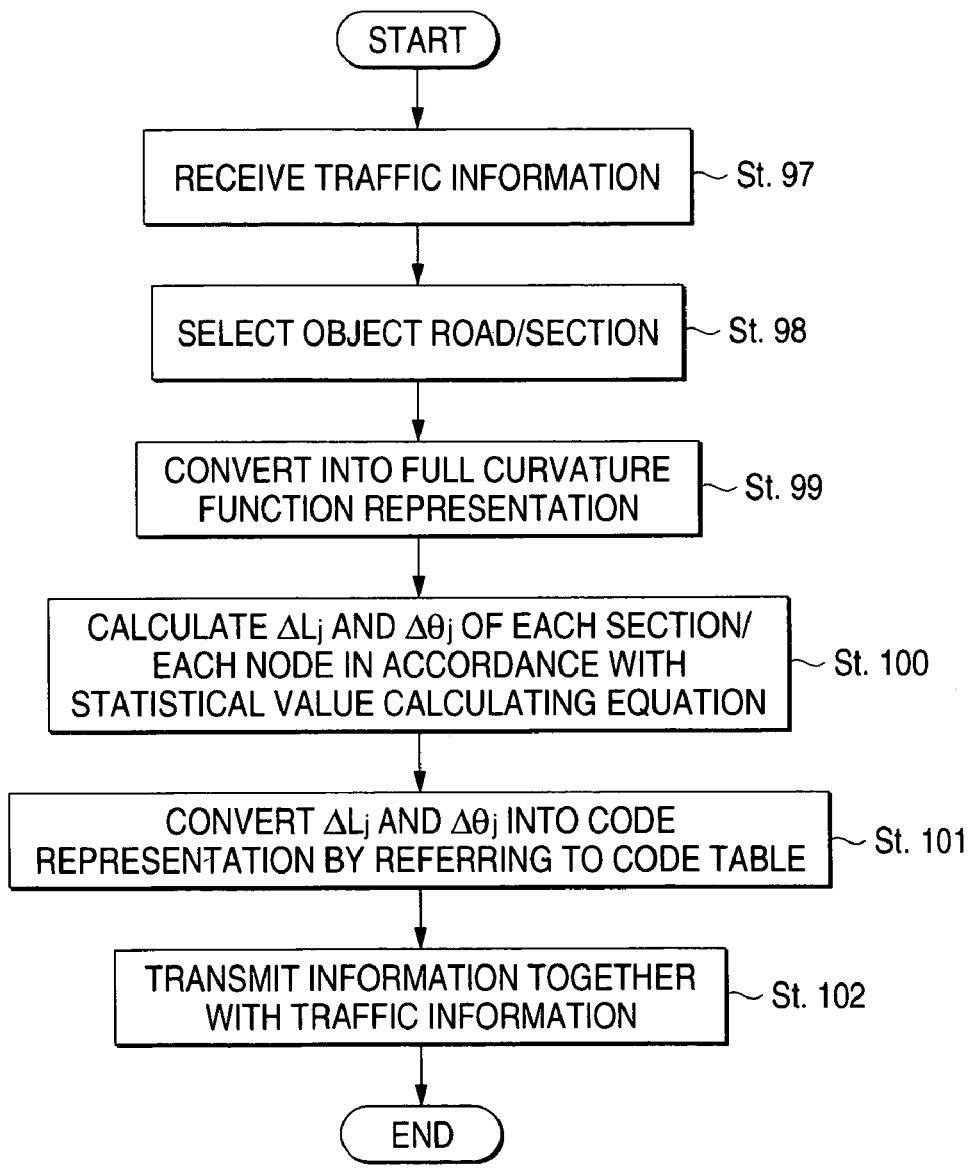

FIG. 29

| VECTOR DATA TYPE (= ROAD) ||
|---|---|
| CODE TABLE DATA ||
| PRECISION INFORMATION ABOUT SHAPE ACQUISITION SOURCE MAP DATA ||
| ONE-WAY DIRECTION (FORWARD/REVERSE/NONE) ||
| TOTAL NUMBER OF NODES ||
| NODE NUMBER p1 ||
| NODE p1 X DIRECTION ABSOLUTE COORDINATE (LONGITUDE) ||
| NODE p1 Y DIRECTION ABSOLUTE COORDINATE (LATITUDE) ||
| NODE p1 ABSOLUTE AZIMUTH ||
| DISTANCE L FROM NODE p1 TO NEXT SHAPE NODE ||
| CODED DATA BETWEEN NODES p1 AND p2 (BIT STRING HAVING $\Delta L_j$ AND $\Delta \theta_j$ CODED) ||
| MAXIMUM POSITION ERROR OF REPRODUCED SHAPE BETWEEN p1 AND p2 (m) | MAXIMUM AZIMUTH ERROR OF REPRODUCED SHAPE BETWEEN p1 AND p2 (m) |
| NODE NUMBER p2 ||
| NODE p2 X DIRECTION RELATIVE COORDINATE (LONGITUDE) ||
| NODE p2 Y DIRECTION RELATIVE COORDINATE (LATITUDE) ||
| NODE p2 ABSOLUTE AZIMUTH ||
| ⋮ ||
| NODE NUMBER pn ||
| NODE pn X DIRECTION RELATIVE COORDINATE (LONGITUDE) ||
| NODE pn Y DIRECTION RELATIVE COORDINATE (LATITUDE) ||
| NODE pn ABSOLUTE AZIMUTH ||

FIG. 30

| |
|---|
| EVENT NUMBER (= ACCIDENT) |
| RELATED AND REGULATED INFORMATION (ONE LANE REGULATION) |
| GENERATION PLACE REFERENCE POINT NODE NUMBER (= p1) |
| DIRECTION FLAG (= FORWARD DIRECTION WITH RESPECT TO NODE STRING) |
| RELATIVE DISTANCE FROM REFERENCE POINT (m) |
| ⋮ |
| EVENT NUMBER (= TRAFFIC JAM) |
| MEAN SPEED IN TRAFFIC JAM (= 15km) |
| GENERATION PLACE REFERENCE POINT NODE NUMBER (= pj) |
| DIRECTION FLAG (= REVERSE DIRECTION TO NODE STRING) |
| RELATIVE DISTANCE FROM REFERENCE POINT (STARTING SIDE) (m) |
| RELATIVE DISTANCE FROM REFERENCE POINT (ENDING SIDE) (m) |

| INPUT VALUE | | CODE | OVERHEAD BIT |
|---|---|---|---|
| RUN-LENGTH | VALUE OF ΔL (X UNIT LENGTH <m>) | | |
| 0 | 0 | 0 | 1 (+θ, -θ IDENTIFICATION) |
| 5 | 0 | 100 | 1 (+θ, -θ IDENTIFICATION) |
| 10 | 0 | 101 | 1 (+θ, -θ IDENTIFICATION) |
| 15 | 0 | 1100 | 1 (+θ, -θ IDENTIFICATION) |
| 0 | ±1 | 1101 | 2 (±IDENTIFICATION OF ΔL/ +θ, -θ IDENTIFICATION) |
| 0 | ±2 | 1110 | 2 (±IDENTIFICATION OF ΔL/ +θ, -θ IDENTIFICATION) |
| 0 | ±3 | 11110 | 2 (±IDENTIFICATION OF ΔL/ +θ, -θ IDENTIFICATION) |
| ⋮ | ⋮ | ⋮ | ⋮ |

FIG. 35

| |
|---|
| VECTOR DATA TYPE (= ROAD) |
| CODE TABLE DATA |
| SAMPLE ANGLE θ (°) |
| PRECISION INFORMATION ABOUT SHAPE ACQUISITION SOURCE MAP DATA |
| ONE-WAY DIRECTION (FORWARD/REVERSE/NONE) |
| TOTAL NUMBER OF NODES |
| NODE NUMBER p1 |
| NODE p1 X DIRECTION ABSOLUTE COORDINATE (LONGITUDE) |
| NODE p1 Y DIRECTION ABSOLUTE COORDINATE (LATITUDE) |
| NODE p1 ABSOLUTE AZIMUTH |
| DISTANCE L FROM NODE p1 TO NEXT SHAPE NODE |
| CODEED DATA BETWEEN NODES p1 AND p2 (BIT STRING HAVING ΔLj CODED) |

| MAXIMUM POSITION ERROR OF REPRODUCED SHAPE BETWEEN p1 AND p2 (m) | MAXIMUM AZIMUTH ERROR OF REPRODUCED SHAPE BETWEEN p1 AND p2 (m) |
|---|---|

| |
|---|
| NODE NUMBER p2 |
| NODE p2 X DIRECTION RELATIVE COORDINATE (LONGITUDE) |
| NODE p2 Y DIRECTION RELATIVE COORDINATE (LATITUDE) |
| NODE p2 ABSOLUTE AZIMUTH |
| ⋮ |
| NODE NUMBER pn |
| NODE pn X DIRECTION RELATIVE COORDINATE (LONGITUDE) |
| NODE pn Y DIRECTION RELATIVE COORDINATE (LATITUDE) |
| NODE pn ABSOLUTE AZIMUTH |

FIG. 40

| VECTOR DATA TYPE (= ROAD) | |
|---|---|
| ANGLE REPRESENTATION IDENTIFICATION FLAG (0 WITH θ/1 WITH Δθ) | |
| CODE TABLE DATA | |
| SAMPLE SECTION LENGTH L (m) | |
| PRECISION INFORMATION ABOUT SHAPE ACQUISITION SOURCE MAP DATA | |
| ONE-WAY DIRECTION (FORWARD/REVERSE/NONE) | |
| TOTAL NUMBER OF NODES | |
| NODE NUMBER p1 | |
| NODE p1 X DIRECTION ABSOLUTE COORDINATE (LONGITUDE) | |
| NODE p1 Y DIRECTION ABSOLUTE COORDINATE (LATITUDE) | |
| NODE p1 ABSOLUTE AZIMUTH | |
| CODED DATA BETWEEN NODES p1 AND p2 (BIT STRING HAVING θ OR Δθ CODED) | |
| MAXIMUM POSITION ERROR OF REPRODUCED SHAPE BETWEEN p1 AND p2 (m) | MAXIMUM AZIMUTH ERROR OF REPRODUCED SHAPE BETWEEN p1 AND p2 (m) |
| NODE NUMBER p2 | |
| NODE p2 X DIRECTION RELATIVE COORDINATE (LONGITUDE) | |
| NODE p2 Y DIRECTION RELATIVE COORDINATE (LATITUDE) | |
| NODE p2 ABSOLUTE AZIMUTH | |
| ⋮ | |
| NODE NUMBER pn | |
| NODE pn X DIRECTION RELATIVE COORDINATE (LONGITUDE) | |
| NODE pn Y DIRECTION RELATIVE COORDINATE (LATITUDE) | |
| NODE pn ABSOLUTE AZIMUTH | |

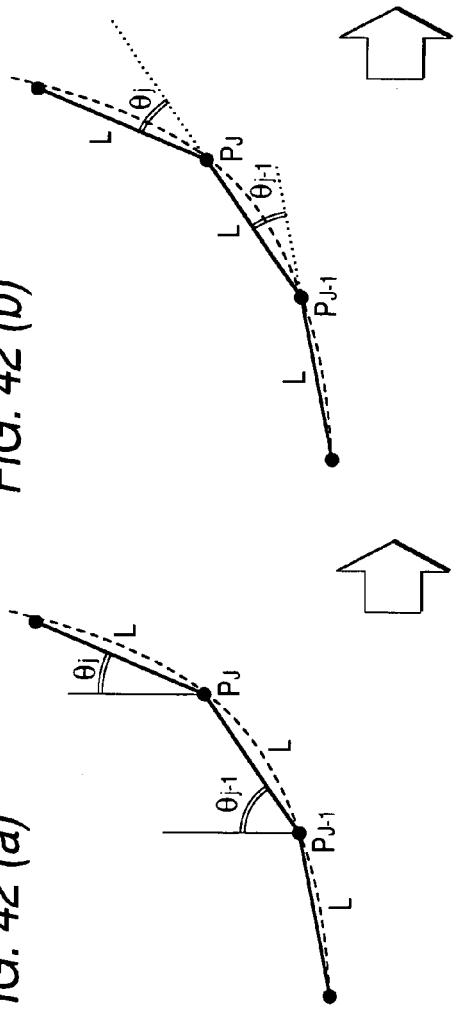
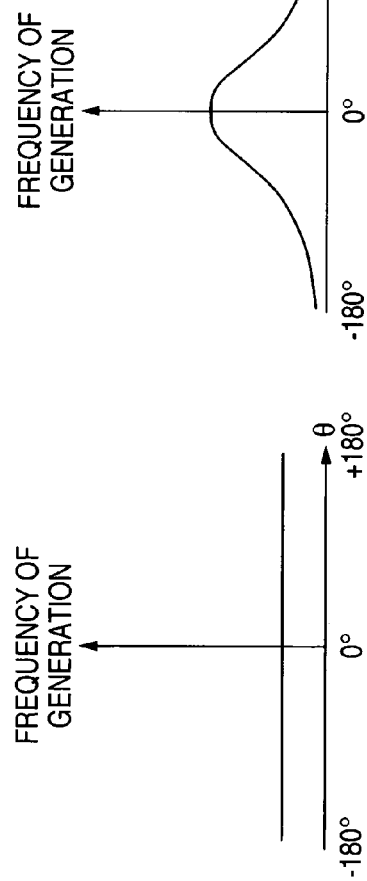
FIG. 42 (a) FIG. 42 (b) FIG. 42 (c)
FIG. 42 (a') FIG. 42 (b') FIG. 42 (c')

FIG. 43

| |
|---|
| ROAD TYPE OF OBJECT ROAD |
| ONE-WAY DIRECTION (FORWARD/REVERSE/NONE) |
| TOTAL NUMBER OF NODES |
| NODE NUMBER p1 |
| NODE p1 X DIRECTION ABSOLUTE COORDINATE (LONGITUDE) |
| NODE p1 Y DIRECTION ABSOLUTE COORDINATE (LATITUDE) |
| NODE p1 ABSOLUTE AZIMUTH |
| NODE NUMBER p2 |
| NODE p2 X DIRECTION RELATIVE COORDINATE (LONGITUDE) |
| NODE p2 Y DIRECTION RELATIVE COORDINATE (LATITUDE) |
| NODE p2 ABSOLUTE AZIMUTH |
| ⋮ |
| NODE NUMBER pn |
| NODE pn X DIRECTION RELATIVE COORDINATE (LONGITUDE) |
| NODE pn Y DIRECTION RELATIVE COORDINATE (LATITUDE) |

FIG. 44

| |
|---|
| EVENT NUMBER (= TRAFFIC JAM) |
| MEAN SPEED IN TRAFFIC JAM (= 15km) |
| GENERATION PLACE REFERENCE POINT NODE NUMBER (= pj) |
| DIRECTION FLAG (= REVERSE DIRECTION TO NODE STRING) |
| RELATIVE DISTANCE FROM REFERENCE POINT (STARTING SIDE) (m) |
| RELATIVE DISTANCE FROM REFERENCE POINT (ENDING SIDE) (m) |

US 7,333,666 B2

DIGITAL MAP SHAPE VECTOR ENCODING METHOD AND POSITION INFORMATION TRANSFER METHOD

TECHNICAL FIELD

The present invention relates to a method of transmitting position information of a digital map, a coding method of compressing and coding the data volume of data to be transmitted and a device thereof, and more particularly to a reduction in a data volume by using a compression and coding technique.

BACKGROUND ART

In the case in which traffic information is to be provided to a navigation onboard machine for mounting a digital map data base, conventionally, a road is specified by a link number and a node such as an intersection present on the road is specified by a node number and a point on the road is transmitted in such a method as to represent a distance from the node in such a manner that a position on the digital map is accurately transmitted even if a transmitting side and a receiving side hold digital maps created by different sources.

However, the node number and the link number which are defined in a road network are to be changed to new numbers corresponding to the new provision or alteration of a road. Moreover, the digital map data of each company to be a creation source are to he also updated correspondingly. Therefore, the methods using the node number and the link number require a large social cost for maintenance.

In order to improve such a respect, the inventors of the invention have proposed the following digital map position information transmitting method in JP-A-11-214068 and JP-A-11-242166.

In such a method, when the information providing side is to transmit the position of a road in which an event such as a traffic jam or a traffic accident is caused, "road shape data" comprising the coordinate string of a node and an interpolation point (the vertex of a polygonal line approximating the curve of the road which will be referred to as a "node" including the interpolation point if there is no restriction in this specification) arranged on the road taking a shape in a road section having a predetermined length which includes the event position and "event position data" indicative of the event position based on a relative position in the road section represented by the road shape data are transmitted to the receiving side, the side receiving these information carries out map matching by using the road shape data to specify the road section on a self-digital map, thereby specifying an event generation position in the road section by using the event position data.

FIG. 43 illustrates the "road shape data" and FIG. 44 illustrates the "event position data".

In a method of transmitting the position information of the digital map by using the "road shape data" and the "event position data", however, there is a problem in that the data volume of the road shape data for specifying the shape of a road is increased and the amount of data transmission is thereby increased.

As a method of reducing the data volume of the road shape data, the inventors of the invention has proposed a method of approximating the shape of a road by a spline function in JP-A-2001-12127. In order to fix the position information transmitting method, it is necessary to further promote a reduction in the data volume.

The invention solves such a problem and has an object to provide a position information transmitting method of transmitting position information of a digital map in a small data volume by utilizing a compression and coding technique, a coding method of reducing a data volume and a device for executing the methods.

SUMMARY OF THE INVENTION

Moreover, in a position information transmitting method for a digital map in which a transmitting side transmits shape data representing a shape vector on the digital map and a receiving side carries out map matching based on the received shape data and specifies the shape vector on a self-digital map, wherein the transmitting side transmits shape vector data coded by the coding method and the receiving side decodes the received data and reproduces a shape, and specifies a shape vector corresponding to the reproduced shape by the map matching.

Furthermore, a transmitter for transmitting, to a receiving side, shape data representing a shape vector on a digital map comprises code table calculating means for carrying out an arithmetic processing over position information of each node of a node string representing the shape vector on the digital map, converting the position information into data having a reduced statistical deviation and generating a code table using coding for the data based on an occurrence distribution of the data, and position information converting means for coding position information of each node of the shape vector to be transmitted to the receiving side by using the code table and for generating shape data to be transmitted to the receiving side.

Moreover, a receiver for receiving coded data representing a shape vector on a digital map from a transmitting side comprises code data decoding means for decoding the received data which are coded and for reproducing shape data represented by position information on the digital map, and map matching means for carrying out map matching by using the shape data thus reproduced, thereby specifying the shape vector on a self-digital map.

Consequently, the data volume of the shape vector in the digital map can be compressed efficiently and the volume of data to be transferred can considerably be decreased when the shape vector of the digital map is to be transmitted. On the receiving side, the shape data are reconstituted from the received data and the map matching is executed so that the transmitted shape vector can be specified accurately.

BRIEF DESCRIPTION OF THE DRAWINGS

FIG. 3 is a run-length code table to be used in a coding method according to a second embodiment, FIG. 4 is a code table for $\Delta\theta$ to be used in the coding method according to the second embodiment, FIG. 5 is a code table for $\Delta\theta$ to take a run-length into consideration which is to be used in the coding method according to the second embodiment, FIG. 9 is a table showing the structure of shape vector data string information for specifying road/section as transmitted data in the position information transmitting method according to the third embodiment, FIG. 10 is a table showing the structure of various traffic information represented by relative distance from each node on shape vector data as transmitted data in the position information transmitting method according to the third embodiment, FIG. 19 is a code table in the coding method according to the fourth embodiment, FIG. 22 is a table showing the structure of transmitted data in a position information transmitting method according to the fourth embodiment, FIG. 23($a$), ($b$), ($c$) are diagrams typically showing the transmission of data in the coding method according to the fourth embodiment, FIG. 24 is a flow chart showing a processing procedure on the receiving side in the position information transmitting method according to the fourth embodiment, FIG. 25 is a diagram showing a node position, a distance and angle information to which a coding method according to a fifth embodiment is applied, FIGS. 26($a$), ($b$) is a code table to be used in the coding method according to the fifth embodiment, FIG. 28 is a flow chart showing a shape data creating procedure in the coding method according to the fifth embodiment, FIG. 29 is a table showing the structure of shape vector data string information for specifying road/section as transmitted data in a position information transmitting method according to the fifth embodiment, FIG. 30 is a table showing the structure of various traffic information represented by relative distance from each node on shape vector data in a position information transmitting method according to the fifth embodiment, FIG. 35 is a table showing the structure of shape vector data string information for specifying road/section as transmitted data in a position information transmitting method according to the sixth embodiment, FIG. 40 is a table showing the structure of shape vector data string information for specifying road/section as transmitted data in a position information transmitting method according to the seventh embodiment, FIG. 43 is a table showing a data structure of shape vector date string information in a conventional position information transmitting method, FIG. 44 is a table showing a data structure of traffic information in a conventional position information transmitting method.

Figures 1, 2:
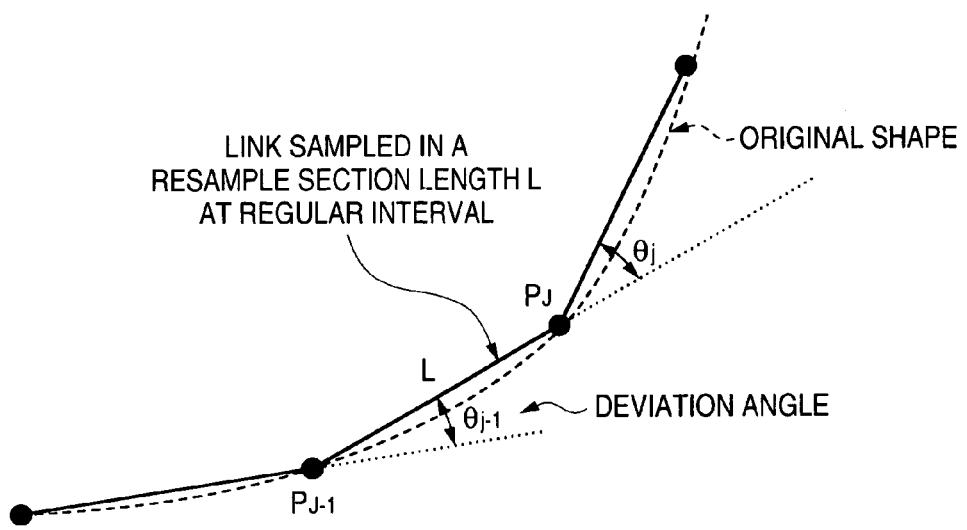
FIG. 1 is a diagram showing a node resampled in the case in which a coding method according to a first embodiment is applied.
FIG. 2 is a code table in the coding method according to the first embodiment.

Additionally, the reference numerals in the drawings, 10 and 30 show online processing portion, 11 shows event information input portion, 12 shows digital map display portion, 13 and 22 show digital map data base, 14 shows map matching portion, 15 shows position information converting portion, 16 shows position information transmitting portion, 17 shows position information receiving portion, 18 shows code data decompressing portion, 20 shows offline processing portion, 21 shows past traffic information, 23 shows code table calculating portion, 24 shows code table data, and 40 shows a road.

DETAILED DESCRIPTION OF THE PREFERRED EMBODIMENTS

First Embodiment

In a first embodiment, description will be given to a method of compressing data by variable-length coding.

In a method of transmitting position information of a digital map according to the invention, first of all, the shape of a road is expressed in shape data having a statistical deviation. The reason is that a compressibility is to be increased when the shape data are compressed and coded.

Figure 41:
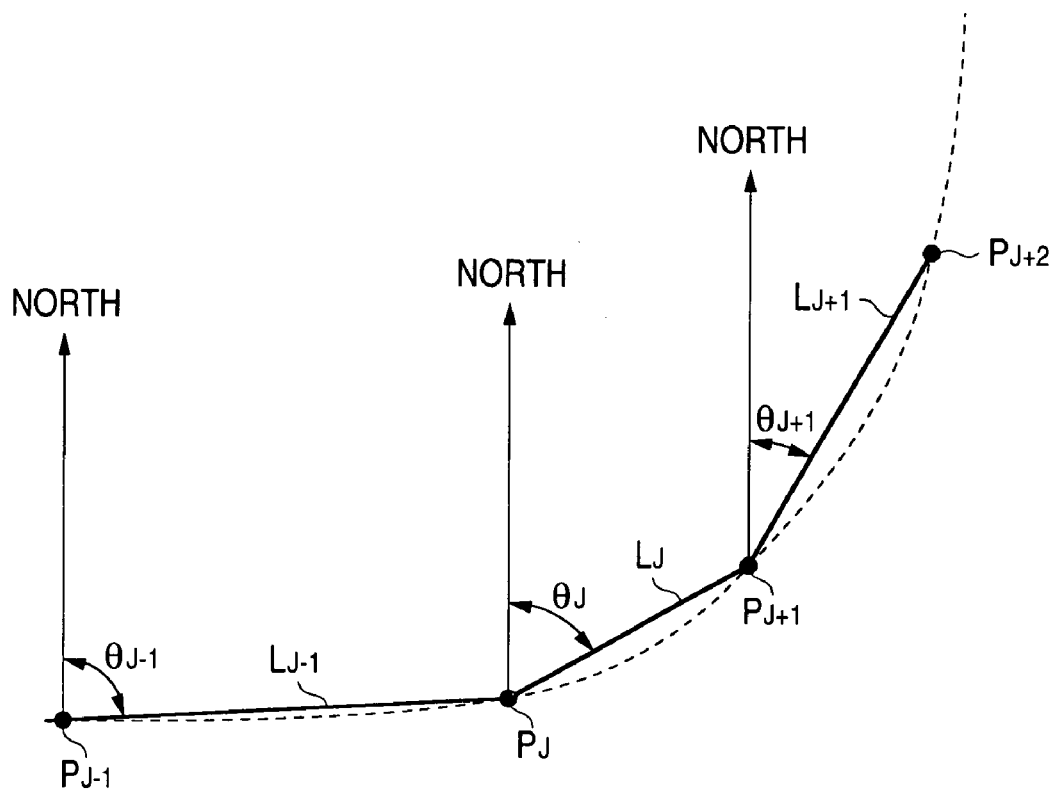
FIG. 41 is a diagram for explaining a distance and an angle which specify a coordinate point, FIGS. 42($a$) and ($a'$) are a diagram and a chart which show the full curvature function representation of shape data, FIGS. 42($b$) and ($b'$) are a diagram and a chart which show the deflection angle representation of the shape data, FIGS. 42($c$) and ($c'$) are a diagram and a chart showing the predicted value difference representation of a deviation angle of the shape data.

In the case in which the shape of the road is to be represented by a coordinate point arranged on the road, the position of each coordinate point ($P_J$) can be uniquely specified by two dimensions of a distance from an adjacent coordinate point ($P_{J-1}$) and an angle as shown in FIG. 41. In FIG. 41, the angle indicates an angle $\Theta_j$ based on an "absolute azimuth" for setting a due north (upper in the drawing) azimuth to 0 degree and designating an angle of 0 to 360 degrees clockwise. Thus, the expression of a coordinate point by using the distance and the absolute azimuth is referred to as a full curvature function representation.

When x and y coordinates of coordinate points $P_{J-1}$, $P_J$ and $P_{J+1}$ are set to $(x_{j-1}, y_{j-1})$, $(x_j, y_j)$ and $(x_{j+1}, y_{j+1})$, a distance $L_j$ (a distance between the coordinate points $P_J$ and $P_{J+1}$) and the absolute angle $\Theta_j$ (the absolute azimuth of a straight line extended from the coordinate point $P_J$ to the coordinate point $P_{J+1}$) can be calculated by the following equations.

$$L_j = \sqrt{\{(x_{j+1}-x_j)^2 + (y_{j+1}-y_j)^2\}}$$

$$\Theta_j = \tan^{-1}\{(x_{j+1}-x_j)/(y_{j+1}-y_j)\}$$

In the case in which a new coordinate point is reset (resampled) such that a distance from an adjacent coordinate point is constant (=L) over the shape of the road, information about the angle $\Theta_j$ (that is, information about one dimension) is simply transmitted for the individual coordinate points so that the position of the coordinate point can be specified on the receiving side to reduce the volume of data to be transmitted in addition to common information about L.

FIG. 42(a) shows the absolute azimuth $\Theta_j$ on each coordinate point ($P_J$) in the case in which the coordinate point is resampled in such a position that a distance from an adjacent coordinate point on the road is constant (=L). In the case in which each coordinate point is represented by the absolute azimuth $\Theta_j$, the frequency of generation of the angle information $\Theta_j$ indicative of each coordinate point does not have a statistical deviation, as shown in FIG. 42(a').

However, the angle of each coordinate point can also be represented by a difference in a displacement of the absolute azimuth, that is, a "deviation angle" $\theta_j$ as shown in FIG. 42(b). The deviation angle $\theta_j$ can be calculated as follows.

$$\theta_j = \Theta_j - \Theta_{j-1}$$

In the case in which each coordinate point is represented by the deviation angle $\theta_j$, the frequency of generation of the angle information $\theta_j$ indicative of each coordinate point has a maximum value for $\theta$=0 degree as shown in FIG. 42(b') in a region having a large number of straight roads.

Moreover, the angle of each coordinate point can also be represented by a difference $\Delta\theta_j$ between the deviation angle $\theta_j$ and a deviation angle statistical predicted value $S_j$ (a predicted value represented by a deviation angle) as shown in FIG. 42(c). The deviation angle statistical predicted value $S_j$ is obtained by estimating the deviation angle $\theta_j$ of the coordinate point $P_J$ to be noted through the deviation angles of previous coordinate points up to $P_{J-1}$. For example, the deviation angle statistical predicted value $S_j$ can be defined as $$S_j = \theta_{j-1}$$

or $$S_j = (\theta_{j-1} + \theta_{j-2})/2.$$

Moreover, the deviation angle statistical predicted value $S_j$ may be defined by setting the weighted mean of the deviation angles on past n coordinate points to be $S_j$. The predicted value difference $\Delta\theta_j$ of the deviation angle is calculated as $$\Delta\theta_j = \theta_j - S_j.$$

Most of the road shapes are straight lines or are gentle curves. In the case in which a distance L between the coordinate points is set to be constant, therefore, the predicted value difference $\Delta\theta_j$ of the deviation angle concentrates in the vicinity of 0 degree so that the frequency of generation of angle information $\Delta\theta_j$ indicative of each coordinate point has a great deviation around $\theta$=0 degree as shown in FIG. 42(c').

In order to obtain shape data having a statistical deviation, the road shape (original shape) is sampled at regular intervals in the resample section length L having a constant distance and position data of a sampling point (node) $P_J$ are represented by the predicted value difference $\Delta\theta_j (=\theta_j - S_j)$ of the deviation angle $\theta_j$. The distance may be an actual distance obtained by expansion into an outside world or a length expressed in a unit of predetermined normalized coordinates.

It is defined that the deviation angle statistical predicted angle $S_j$ is set to $$Sj = (\theta_{j-1} + \theta_{j-2})/2.$$

Since the shape of the road is curved gently in most cases, $$\theta_j \approx (\theta_{j-1} + \theta_{j-2})/2 = S_j.$$

Consequently, it can be supposed that $\Delta\theta_j$ is distributed within a very small range around 0.

Theoretically, the $\Delta\theta_j$ can have a value of −360 degrees to +360 degrees. For this reason, 10 bits obtained by adding 1 bit representing a positive or negative sign and 9 bits representing a numeric value of 360 are required for expressing $\Delta\theta_j$ with a 1° resolution. By coding an angle in the vicinity of ±0 degree with a smaller value than 10 bits and assigning a greater value than 10 bits to an angle set apart from ±0 degree, a mean bit number to be used for coding $\Delta\theta_j$ can be set to be smaller than 10 bits and the shape data can be expressed in a small data volume in total.

FIG. 2 illustrates a code table in which a code for coding is assigned to the $\Delta\theta$. If $\Delta\theta$=0 is set, coding to zero is carried out. If $\Delta\theta$=+1 is set, an overhead bit of 0 representing a positive sign is added to a code 100 to obtain 1000. If $\Delta\theta$=−1 is set, an overhead bit of 1 representing a negative sign is added to the code 100 to obtain 1001.

The variable-length coding will be described with reference to FIG. 1. If a node number is 6 (=a start edge+5 nodes), normal coding requires a data volume having a fixed length of 5×10 bits=50 bits in addition to an initial value angle (10 bits). On the contrary, in the case of coding using the code table shown in FIG. 2, if it is assumed that $\Delta\theta_j$ takes a value of 0 three times and a value which is equal to or less than ±2 degrees twice, the data volume can be expressed in 3×1 bit=2×4 bits=11 bits in addition to the initial value angle (10 bits). If the data are "0, 0, +1, −2, 0", they can be expressed in "001000101100" by the coding.

The receiving side can obtain each value of $\Delta\theta$ by applying the value of $\Delta\theta$ in order with reference to a code table which is sent together with the shape data (or is previously held). By sequentially carrying out integration from an initial value, the value of the deviation angle $\theta_j$ on each coordinate point can be decided uniquely.

The code table is created by calculating an angle of $\Delta\theta_j$ on each coordinate point $P_j$, checking the frequency of generation of the angle and using the well-known Huffman tree depending on the frequency of generation.

Thus, an arithmetic processing is carried out over the shape data to have a statistical deviation and the variable-length coding is then performed. Consequently, the data volume of the shape data can be reduced.

While the resampled node position is represented by the distance between the adjacent nodes and the deviation angle, the sampled node position at regular intervals in the resample section length L can also be expressed in relative latitude and longitude coordinates ($\Delta x_j$, $\Delta y_j$). In this case, the statistical value $S_j$ is expressed in $$\Delta x_j = S_{jx} + \delta x_j = \Delta x_{j-1} + \delta x_j$$

$$\Delta y_j = S_{jy} + \delta y_j = \Delta y_{j-1} + \delta y_j$$

on a definition of $S_{jx} = \Delta x_{j-1}$ and $S_{jy} = \Delta y_{j-1}$, and $\delta x_j$ and $\delta y_j$ are variable-length coded and are thus transmitted as the shape data.

Second Embodiment

In a second embodiment, description will be given to a method of compressing data by using a run-length method.

In the example of the first embodiment, in the case in which $\Delta\theta_j$ is coded to express the shape data, "0" continues in a straight road or a road curved with the same curvature. In such a case, a data compressibility is higher in an expression of "0 continues twenty times" than "00000 . . . ". Herein, run-length coding is carried out to compress data.

FIG. 3 shows a code table for the run-length which defines that the same number continuing five times (a run-length of 5) is displayed as "101", for example. FIG. 4 shows the same code table for $\Delta\theta$ as that in FIG. 2.

A data array is determined as run-length →$\Delta\theta$→ run-length →$\Delta\theta$→. . . , for example. When $\Delta\theta$ is
"0, 0, 0, 0, 0, −2, −2, 0, +3, 0, 0, 0, 0, 0, 0, 0, 0, 0, 0, 0, 0, 0, 0, 0, 0, −1 . . . ",
it is expressed in "101·0__0·1011__0·1011__0·0__0·11000__1101·0__0·1001 . . . "→
"1010010110101100011000110101001001 . . . " (32 bits) by a run-length method.

On the other hand, in the case in which the run-length representation is not used,
"00000101110110110000000000000000001001 . . . " (38 bits) is set.

Moreover, the code tables shown in FIGS. 3 and 4 can be restricted to specifically effective tables and can also be collected into one code table as shown in FIG. 5. In FIG. 5, the run-length is defined in only the case of $\Delta\theta$=0. By using the code table in FIG. 5,
"0, 0, 0, 0, 0, −2, −2, 0, +3, 0, 0, 0, 0, 0, 0, 0, 0, 0, 0, 0, 0, 0, 0, 0, 0, −1 . . . " can be expressed in
"100·11101·11101·0·111100·1100·11011 . . . " →
"10011101111010111100110011011 . . . " (29 bits).

In this connection, as compared with an expression method for a fixed length of 1 node and 10 bits, 10 bits×25 nodes=250 bits is obtained. It is apparent that compression to 29÷250=12% is carried out in this example.

Third Embodiment

In a third example, description will be given to a device for executing the position information transmitting method according to the invention.

Figure 6:
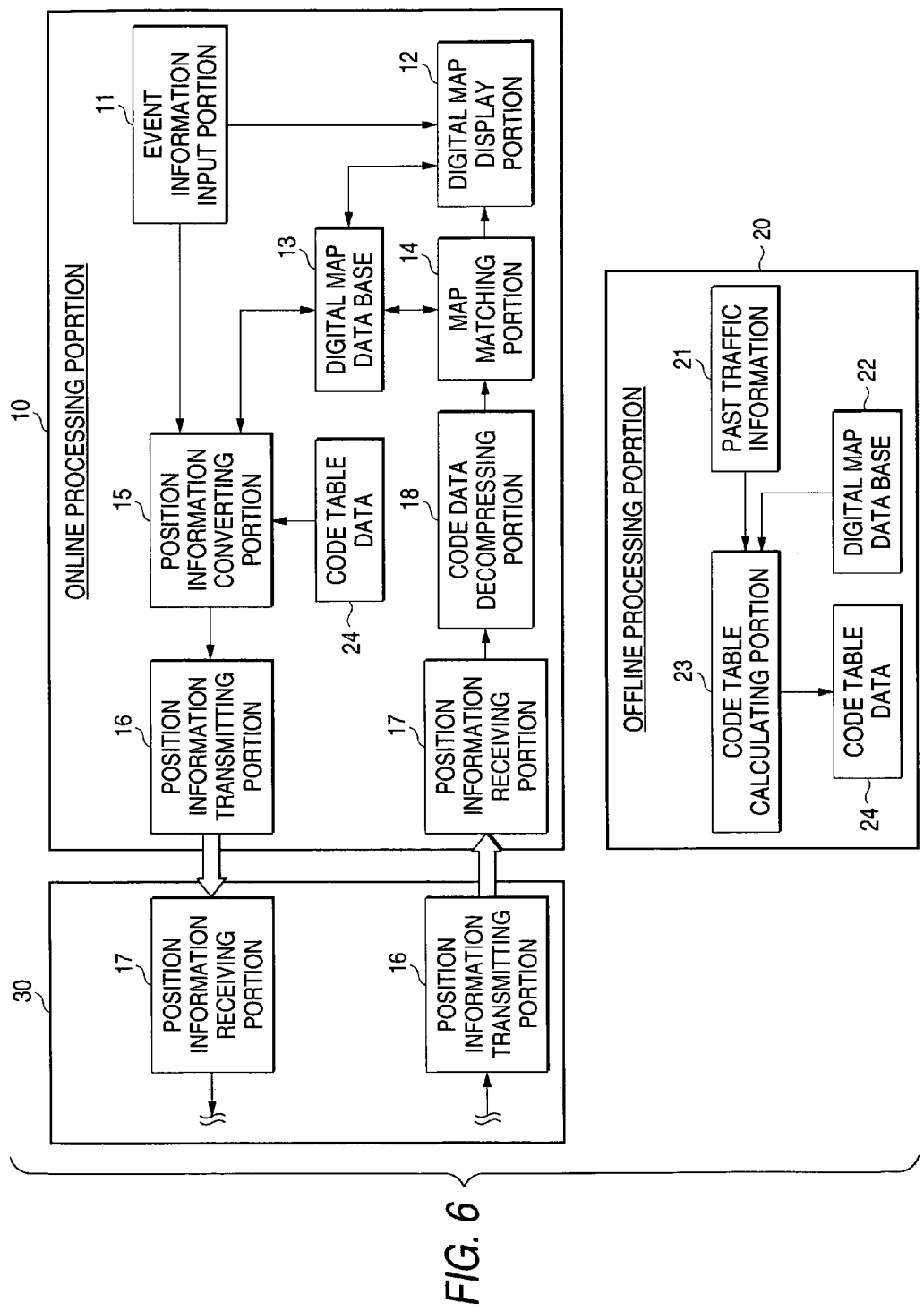
FIG. 6 is a block diagram showing the structure of a device for executing a position information transmitting method according to a third embodiment.

FIG. 6 shows a position information transmitter/receiver for exchanging event generation information on a road together with another device 30 as an example of the device.

The device comprises an offline processing portion 20 for generating a code table to be used for compressing and coding road shape data in an offline, and an online processing portion 10 for transmitting traffic information by using the code table data generated by the offline processing portion 20. The offline processing portion 20 includes a digital map data base 22, a storage portion 21 for storing past traffic information, a code table calculating portion 23 for generating code table data to be used for compression and coding, and a code table data base 24 for storing the code table data thus generated.

On the other hand, the online processing portion 10 includes a position information receiving portion 17 for receiving "road shape data" and "event position data" which are compressed and coded from a position information transmitting portion 16 of the device 30, a code data decompressing portion 18 for decompressing (decoding) the compressed and coded data, a digital map data base 13 for storing digital map data, a map matching portion 14 for carrying out map matching by using the road shape data and the event position data which are decompressed and for specifying an event position on a self-digital map, a digital map display portion 12 for superposing and displaying the event position on the map, an event information input portion 11 for inputting information about a generated event, a position information converting portion 15 for determining an object road section including an event position, generating "event position data" representing the event position as the relative position of the object road section and compressing and coding the shape data of the object road section by using the code table data 24, thereby generating "road shape data", and a position information transmitting portion 16 for transmitting the generated "road shape data" and "even position data" to a position information receiving portion 17 of the device 30.

Figure 7:
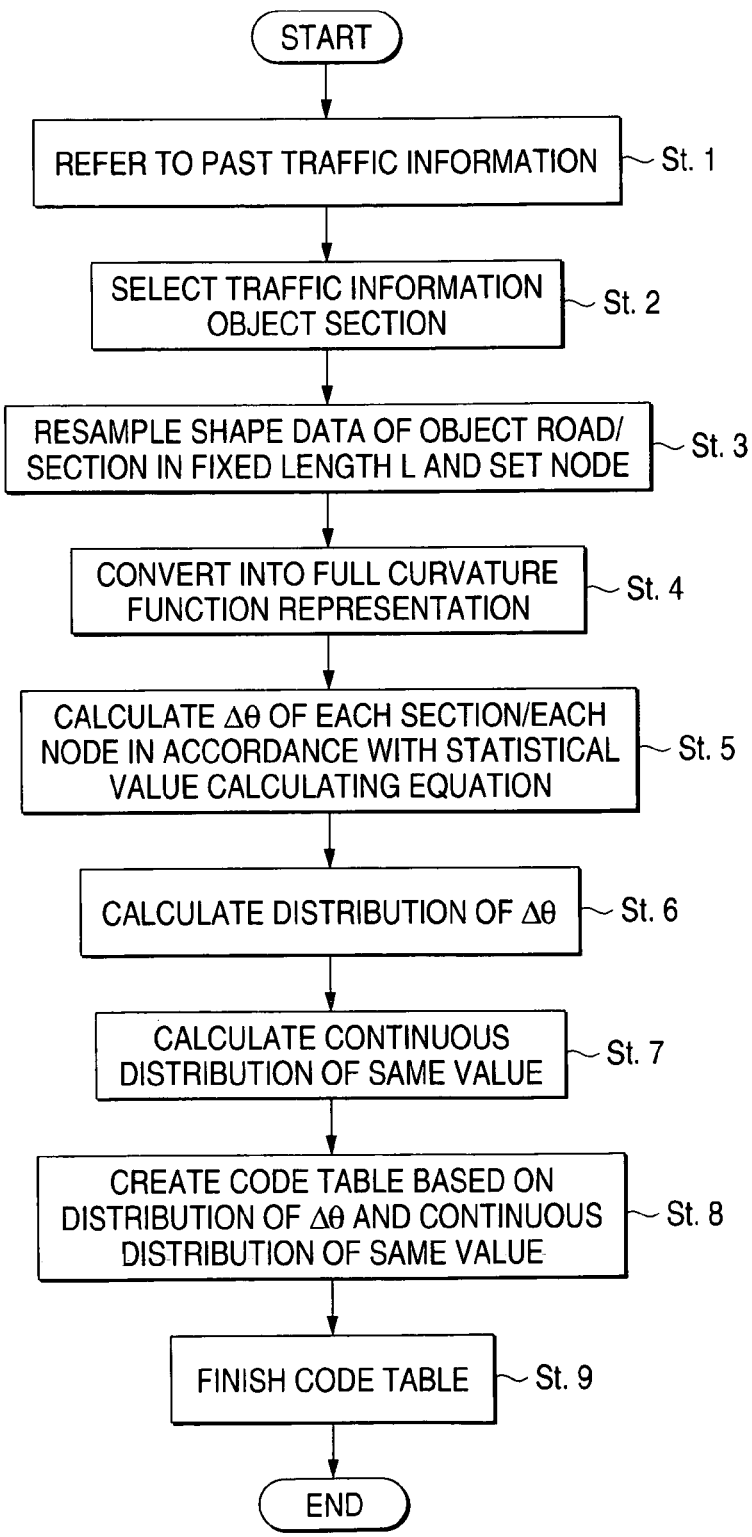
FIG. 7 is a flow chart showing a code table creating procedure in a coding method according to the third embodiment.
Figure 8:
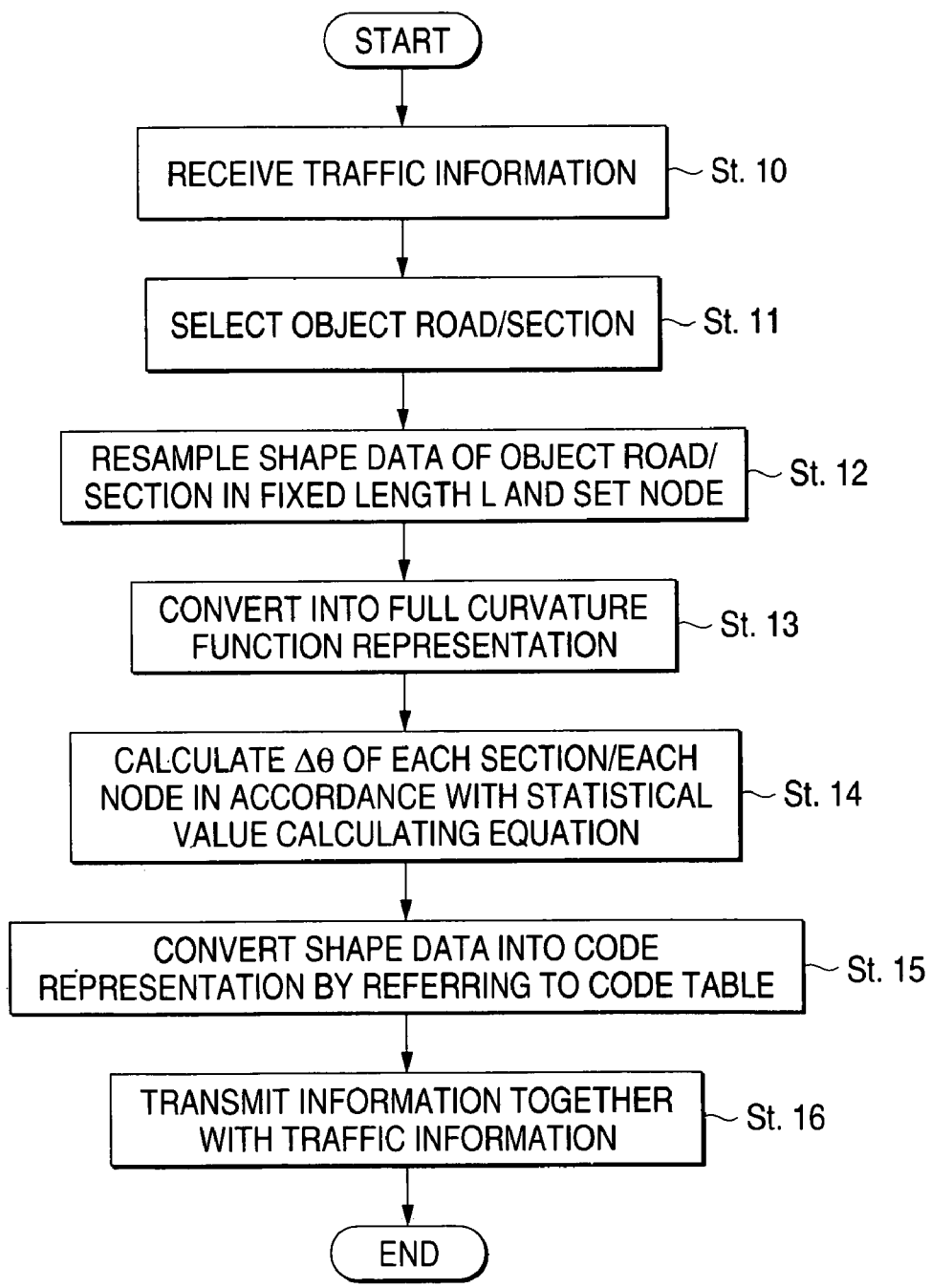
FIG. 8 is a flow chart showing a shape data creating procedure in a coding method according to the third embodiment.

Flow charts in FIG. 7 and FIG. 8 show the procedure of the operation of the device. In the offline processing portion 20, the code table calculating portion 23

Step 1: refers to the past traffic information 21,

Step 2: selects the object road section of the traffic information, and

Step 3: resamples the shape data of the object road section in a fixed length L, thereby setting a node as shown in FIG. 7.

Step 4 Convert position data on the node to a full curvature function representation.

Step 5: Calculate $\Delta\theta$ of each section/each node in accordance with a statistical value calculating equation.

Step 6: Next, calculate the occurrence distribution of $\Delta\theta$.

Step 7: Then, calculate the continuous distribution of the same value.

Step 8: Create a code table based on the occurrence distribution of Δθ and the continuous distribution of the same value.

Step 9: Store the finished code table in the code table data base 24.

The processing procedure is defined by a program for causing the computer of the offline processing portion 20 to function as the code table calculating portion 23.

In the online processing portion 10, moreover, the position information converting portion 15

Step 10: receives the traffic information from the event information input portion 11, Step 11: selects an object road section including the position of generation of the traffic event, and Step 12: resamples the shape data of the object road section in a fixed length L, thereby setting a node as shown in FIG. 8.

Step 13: Convert position data on the node into a full curvature function representation.

Step 14: Calculate Δθ of each section/each node in accordance with a statistical value calculating equation.

Step 15: convert the shape data into a code representation by referring to the code table data 24 of a code table created to be intended for the object road section (or a code table created to be intended for a road having a shape to approximate the object road section).

Step 16: Transmit the shape data on the object road section which are coded together with data on an event position represented by relative information about the object road section.

The processing procedure is defined by a program for causing the computer of the online processing portion 10 to function as the position information converting portion 15.

FIG. 9 and FIG. 10 show road shape data (FIG. 9) and event position data (FIG. 10) which are to be transmitted. The road shape data include code table data, data on the section length L which are resampled, and shape data which are compressed and coded.

Figure 11:
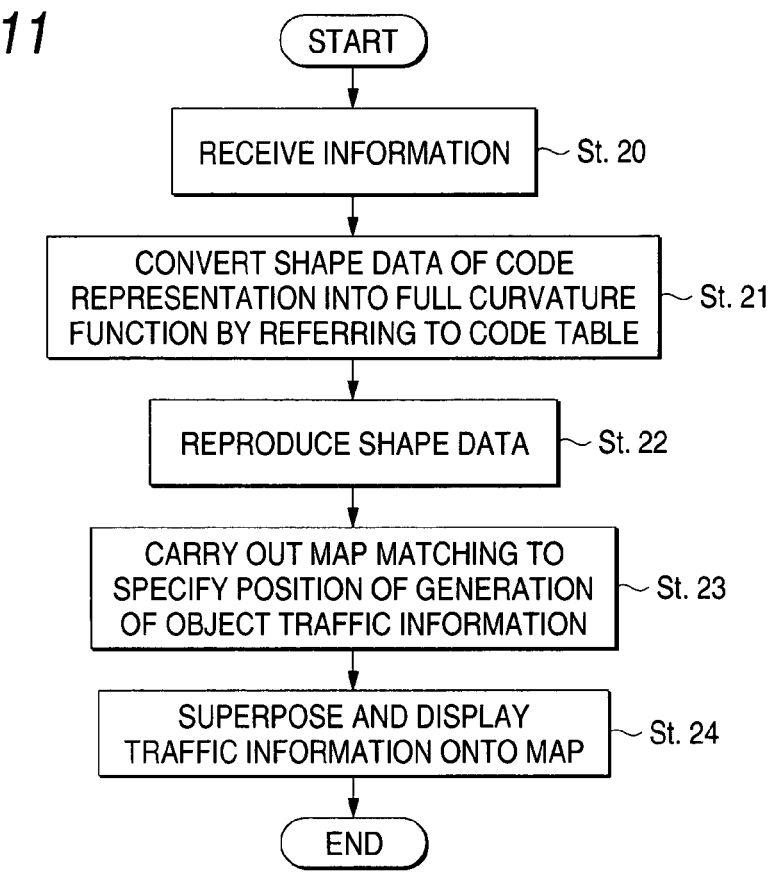
FIG. 11 is a flow chart showing a processing procedure on the receiving side in the position information transmitting method according to the third embodiment.

FIG. 11 shows the processing procedure of the receiving side which receives the data.

Step 20: When the position information receiving portion 17 receives position information, Step 21: the code data decompressing portion 18 reconstitutes coded data by referring to a code table included in the received data and converts shape data into a full curvature function.

Step 22: Next, shape data expressed in latitude and longitude coordinates are reproduced.

Step 23: The map matching portion 14 executes map matching with the reproduced shape and the road shape of a self-digital map to specify an object road section, and furthermore, to specify a traffic event generation position in the object road section from event position data.

Step 24: The digital map display portion 12 superposes and displays traffic information on the map.

The processing procedure is defined by a program for causing the computer of the online processing portion 10 to function as the code data decompressing portion 18 and the map matching portion 14.

While the code table used in the compression and coding is included in the data to be transmitted and is thus transmitted, it is not necessary to include the code table in the data to be transmitted by causing the transmitting and receiving sides to previously have the same code table.

There has been described the example in which the code table data 24 created by the offline processing portion 20 are utilized to obtain the shape data compressed and coded by the online processing portion 10. The offline processing portion 20 compresses and codes each road shape of an object region and previously holds the shape data of each road section which are represented by a code. When acquiring information about the generation of a traffic event, the online processing portion 10 may select the road shape data coded in the road section including a traffic event generation position from the shape data held in the offline processing portion 20, generate traffic information in which the traffic event generation position is represented by the relative position of the road section and transmit, to the receiving side, the coded road shape data thus selected and the generated traffic information.

In this case, the offline processing portion 20 resamples the shape data of the road section to be a coding object in a fixed length L in the procedure of Steps 2 to 9, calculates Δθ in each node and creates a code table based on the occurrence distribution of Δθ. By using the code table thus created, next, Δθ on each coordinate point which is resampled is converted into a code representation and compressed and coded shape data are created and are stored in a data base. By repetitively executing the processing for each road section of an object region, it is possible to hold the compressed and coded shape data in each road section included in the object region.

Thus, it is also possible to utilize, in an online processing, the result of resampling in the fixed length L for the road shape which is executed in an offline.

Fourth Embodiment

In a fourth embodiment, description will be given to a method of introducing an irreversible compressing method to highly compress road shape data.

In the transmission of voice data and image data, a processing is carried out to decrease a sampling point within a negligible range in respect of a sensation (visual sense/auditory sense) in order to enhance a compressibility, to decrease the quantization digit number of measuring information or to manipulate the measuring information so as to increase the compressibility. In the case in which these processings are executed, original data cannot be completely reconstituted on the receiving side. In the case in which there is no hindrance even if the data are varied more or less, the data can be considerably compressed by the introduction of the irreversible compression processing.

In the position information transmitting method according to the invention, the receiving side executes map matching to specify a road shape. Therefore, it is necessary to transmit an accurate shape in the start and end points of an object road section and a portion in which mismatching is apt to be generated. In other portions, even if the shape to be transmitted is slightly ambiguous, an original position can be specified on the receiving side. Also in the position information transmitting method according to the invention, therefore, it is possible to introduce an irreversible compressing method to increase the compressibility of data to be transmitted.

In the compressing method according to the embodiment, the compressibility of data is increased by the following method.

Figure 12:
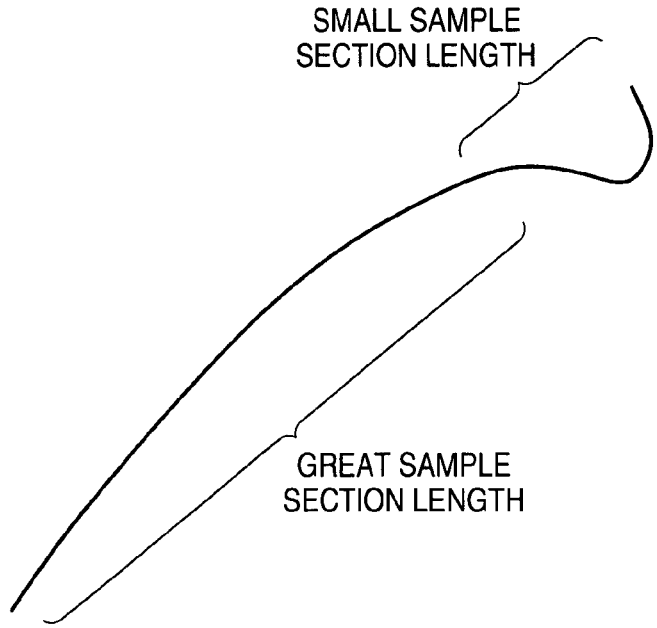
FIG. 12 is a diagram showing the relationship between a sample section length and the curvature of shape data in a coding method according to a fourth embodiment.

(1) To decrease a sampling point within such a range that mismatching is not generated. On a highly curved road having a great curvature, a matching point is shifted from the road and the mismatching might be generated. For this reason, a sampling section length L is set based on the curvature as shown in FIG. 12.

(2) To decrease a quantization digit number representing Δθ within such a range that the mismatching is not generated For example, a minimum resolution is set to 2 degrees and Δθ is quantized in this unit. In this case, a reproduced node position is moved transversely around a true value so that it is a matter of course that the reproduced shape is deformed. For this reason, the receiving side carries out an interpolation processing of smoothing the reproduced shape.

(3) To approximate the shape of the road to a circular arc and a straight line. In the case in which a value is caused to have a deviation in a difference expression based on a deviation angle statistical predicted value $S_j$ to carry out the compression and coding, the deviation concentrates on zero in a road section having the same curvature which is expressed in the circular arc or the straight line. Therefore, the statistical deviation is further increased so that a compression efficiency is rapidly increased. Accordingly, the shape of the road is approximated to the circular arc and the straight line so that a compressibility can be rapidly enhanced. Moreover, the effect of run-length coding can also be increased.

The methods (1), (2) and (3) may be executed singly or in combination.

Description will be given to a specific example in which the compression and coding is carried out by application of the methods (1), (2) and (3).

Figure 13:
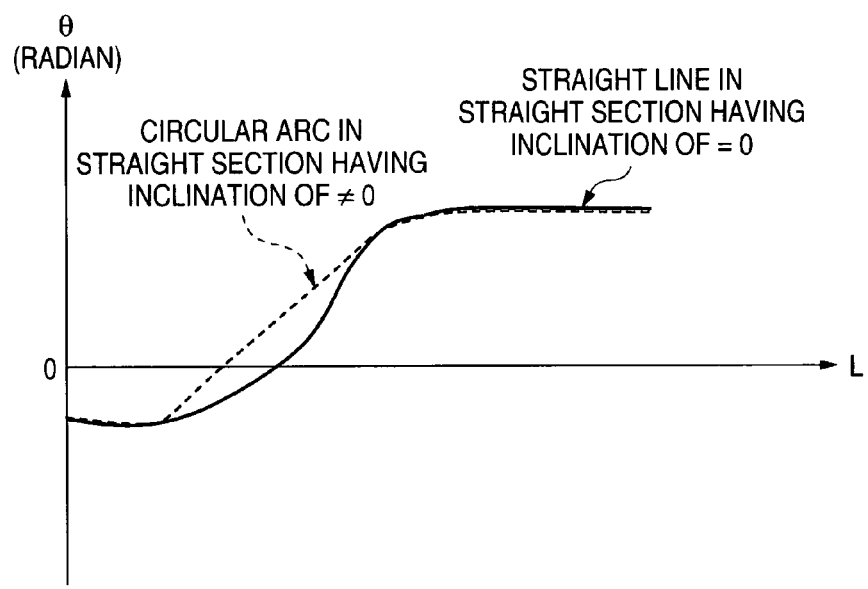
FIG. 13 is a chart for explaining a circular arc and straight-line approximation in the coding method according to the fourth embodiment.

The approximation of the shape of the road to the circular arc and the straight line can be carried out by linearly approximating the shape of the road which is expressed in a full curvature function. The shape of the road in which the point $P_J$ on the road is expressed in the full curvature function as shown in FIG. 1 is displayed as a solid curved line in a coordinate system in which an axis of ordinate indicates $\theta (=\Sigma \theta_j)$ and an axis of abscissa indicates L $(=\Sigma L_i)$ ($L_i$ is constant) as shown in FIG. 13. The approximation of the shape of the road to the circular arc and the straight line indicates the approximation of the curved line to a straight line ($\theta=aL+b$) shown in a dotted line. A straight line ($\theta=b$) having an inclination=0 on the coordinate system represents the linear shape of the road and a straight line ($\theta=aL+b$) having an inclination of ≠0 represents the arcuate shape of the road.

In the approximation, an allowable error is determined along a road section by a method proposed separately by the inventors (JP-A-2001-129665 and JP-A-2001-132611). In the method, a tolerance (an allowable distance error) of an error (a distance error) for a distance and a tolerance (an allowable azimuth error) of an error (an azimuth error) for an azimuth are set as allowable errors in order to satisfy the following conditions in a unit of each node or link included in the shape of a road.

① The allowable distance error is set to be small in the vicinity of the start and end points of an object road section.

② In the case in which parallel roads are adjacent to each other, the allowable distance error is set to be small.

③ The allowable distance error is set to be small around an intersection in which a connecting road having a small intersection angle such as an interchange entrance or exist is present.

④ The allowable azimuth error is set to be smaller if a distance from a surrounding road is shorter.

⑤ There is a high possibility that the separation of the azimuth error might be increased in the portion of the road shape which has a great curvature. Therefore, the allowable azimuth error is set to be small.

Moreover, an allowable error in each node is set separately on the left and right of an object road section. In the proposal, a method of quantitatively calculating an allowable error in a unit of a node has been described specifically.

Figure 14:
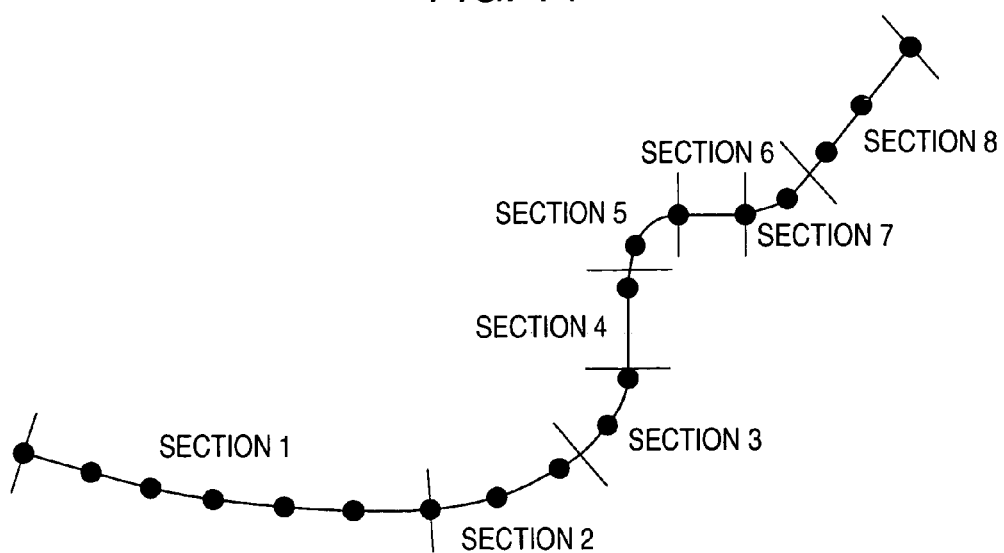
FIG. 14 is a diagram showing a section partitioned in the coding method according to the fourth embodiment, FIG. 15($a$) is a flow chart showing a method of determining a resample section length in the coding method according to the fourth embodiment, FIG. 15($b$) is a diagram showing a table which is referred in the flow chart showed in FIG. 15($a$)

If the allowable error is determined along the road section, the shape of the road is approximated to a circular arc and a straight line so as to enter the range of the allowable error. As shown in FIG. 14, the shape of the road is divided into sections represented by the circular arc or the straight line.

Next, respective resample section lengths of the sections are determined.

The resample section length is determined for each section depending on a curvature $a_j$ of each section j by the following equation.

$$L_j = K \times 1/|a_j|$$

(K is a predetermined constant)

Moreover, the value of $L_j$ may be quantized. If a value taken by $L_j$ through the quantization is any of eight values of 40/80/160/320/640/1280/2560/5120 meters, for example, the value of $L_j$ can be coded to 3 bits to be transmitted.

Figure 15:
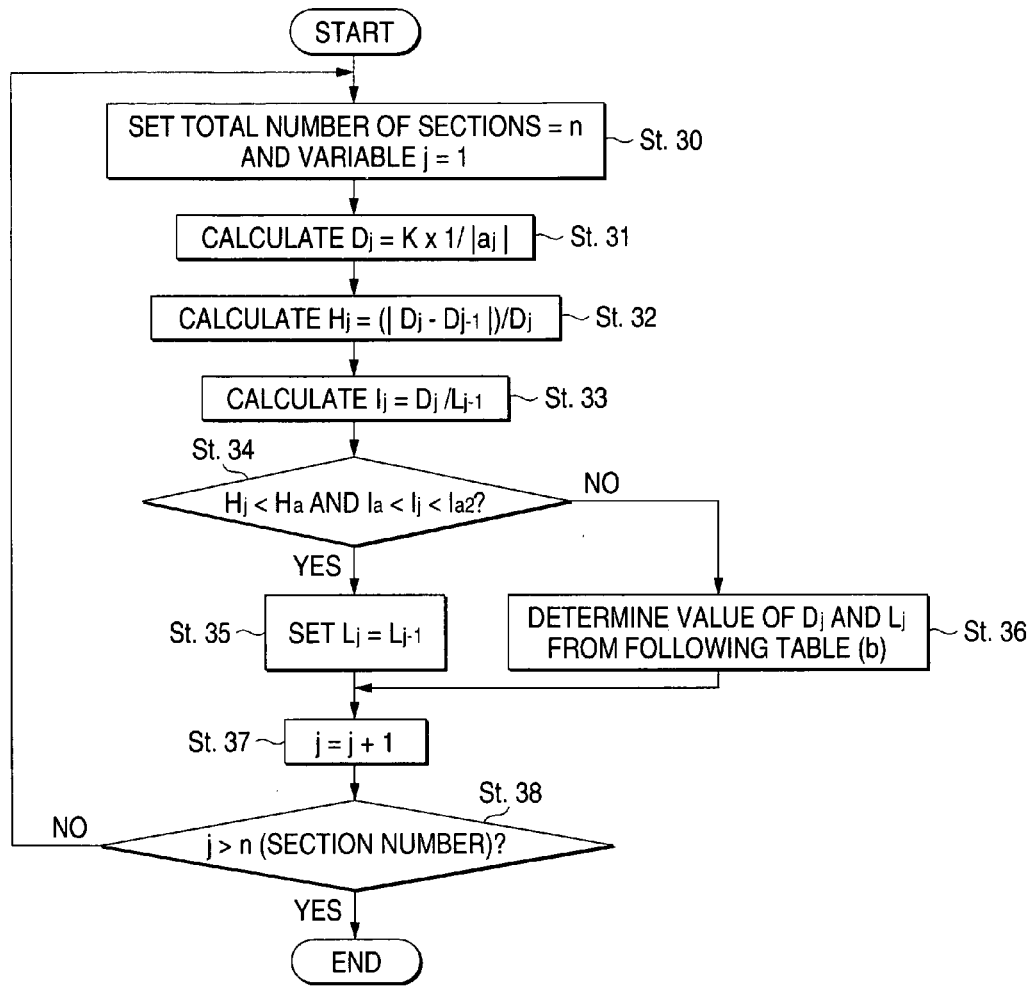

At this time, if the resample section length $L_j$ does not fluctuate between the adjacent sections, a compression efficiency can be increased. FIG. 15(a) shows is a determining procedure for determining a section length to continue if a curvature is less changed in order to suppress a fluctuation in a resample section length. From a first section (Step 30), a resample section length calculated value $D_j$ is obtained from a curvature $a_j$ of each section j in order (Step 31), a change rate $H_j (=|D_j-D_{j-1}|/D_j)$ from a resample section length calculated value $D_{j-1}$ in an adjacent section is obtained (Step 32), and furthermore, a ratio $I_j (=D_j/L_{j-1})$ with a resample section length $L_{j-1}$ in the adjacent section is obtained (Step 33). The change rate $H_j$ of the resample section length calculated value is compared with a predetermined constant $H_a$, and furthermore, the ratio $I_j$ with the resample section length $L_{j-1}$ in the adjacent section is compared with predetermined values $I_{a1}$ and $I_{a2}$. When the ratio $H_j$ is equal to or smaller than $H_a$ and $I_j$ has a value between $I_{a1}$ and $I_{a2}$, the resample section length $L_j$ is set to be equal to the resample section length $L_{j-1}$ in the adjacent section (Step 35). The reason why the resample section length calculated value $D_j$ is compared with the resample section length $L_{j-1}$ in the adjacent section is that the change rate $H_j$ of the resample section length calculated value $D_j$ is small and the resample section length is thereby set to have the same value continuously in order to prevent the separation of the resample section length calculated value $D_j$ from the resample section length $L_j$.

If the decision is NO at the Step 34, the section length $L_j$ is determined from the value of $D_j$ based on a lower table in FIG. 13 in which the relationship between the range of $D_j$ and the section length is set (Step 36). This processing is executed for all the sections (Steps 37 and 38).

$H_a$ is set to have a value of approximately 0.2, $I_{a1}$ is set to have a value of approximately 0.7 and $I_{a2}$ is set to have a value of approximately 2.0.

Figure 16:
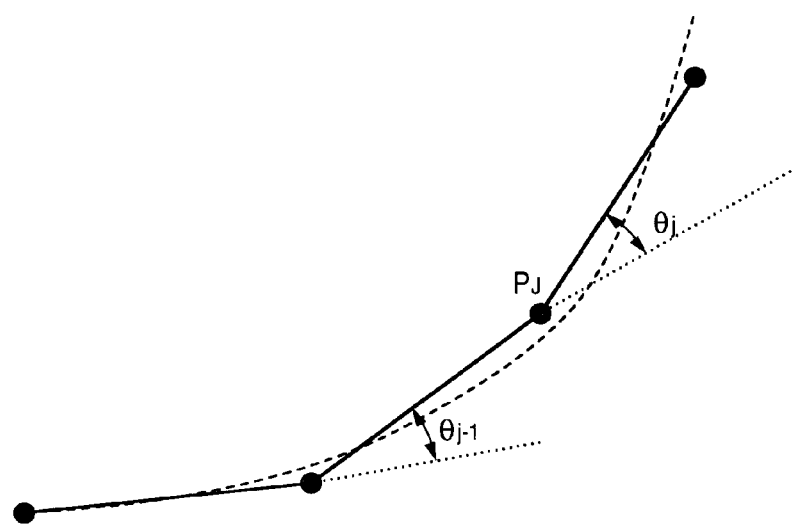
FIG. 16 is a diagram for explaining quantization resampling in the coding method according to the fourth embodiment.

As shown in FIG. 16, next, each section n is sampled in a resample section length $L_n$ at regular intervals to obtain a node $P_J$, and a quantized value of a predicted value difference $\Delta \theta_j (=\theta_j-S_j)$ between a deviation angle $\theta_j$ of $P_J$ and a deviation angle statistical predicted value $S_j$ is calculated.

It is assumed that a deviation angle $\theta_{j-1}$ of a preceding node is used as the deviation angle statistical predicted value $S_j$ ($S_j = \theta_{j-1}$).

Moreover, the quantized value of $\Delta\theta_j$ is obtained with a minimum resolution $\Delta\theta_j$ set to be $\delta°$ (minimum resolution $\delta$).

Figure 17:
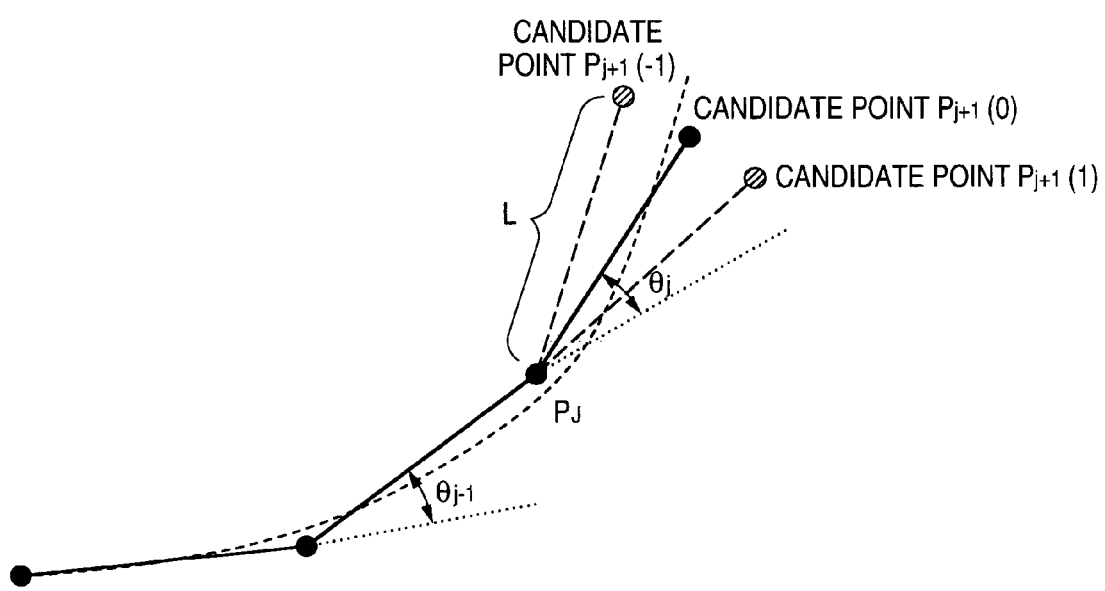
FIG. 17 is a diagram for explaining the candidate point of a next node in the coding method according to the fourth embodiment.

At this time, $\Delta\theta_j$ is set in a unit of $\delta$. Therefore, a node $P_{J+1}$ reproduced from the preceding node $P_J$ based on a distance $L_n$ and angle information $\Delta\theta_j$ is not always positioned on the original road shape (or an approximate shape). As shown in FIG. 17, when a next node $P_{J+1}$ is to be obtained from $P_J$, some candidate points of the node $P_{J+1}$ appear by the way of taking the quantized value of $\Delta\theta_j$. The next node $P_{J+1}$ is selected from the candidate points within the range of an allowable error such that a value of $\Delta\theta$ is set to be zero as continuously as possible. Moreover, such a node selection is continuously carried out so that the node is to be selected in such a direction as to reduce an error between the position of the selected node and a true value (a point on the original road shape) if the same error is increased to the vicinity of the limitation of an allowable error. Also in this case, the node is selected such that $\Delta\theta$ is continuously set to be zero.

Figure 18:
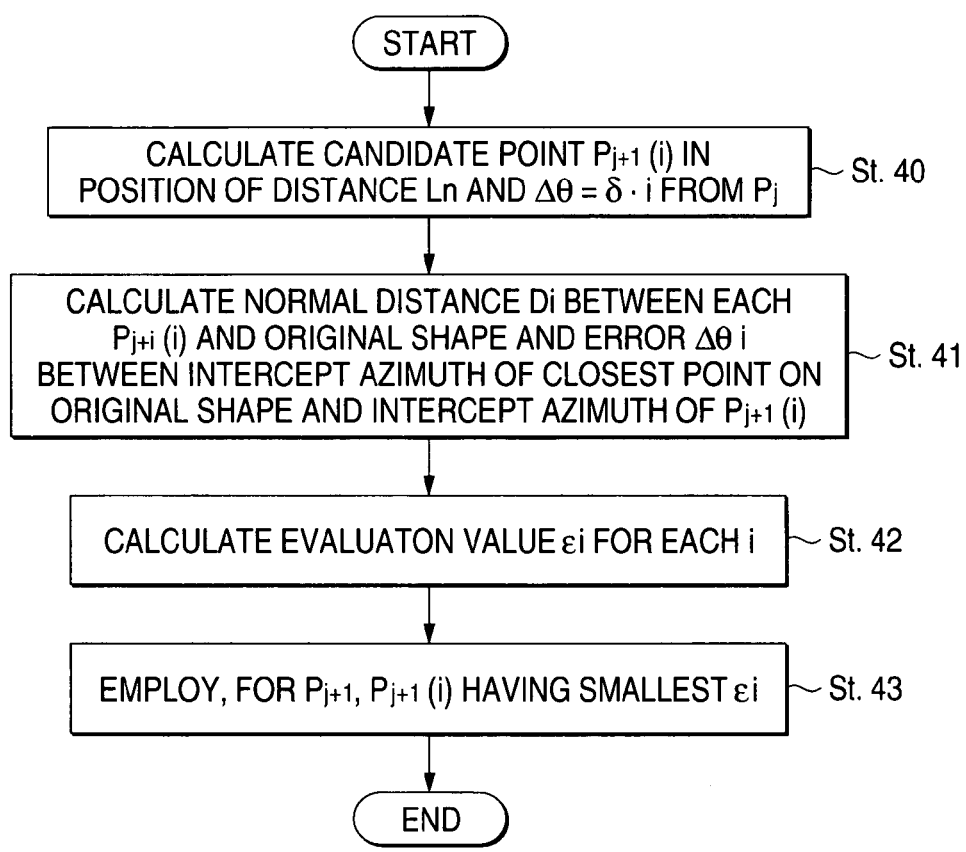
FIG. 18 is a flow chart showing a node determining procedure in the coding method according to the fourth embodiment.

FIG. 18 shows a procedure for selecting one candidate point from a plurality of candidate points $P_{J+1}$ (i) related to one node $P_{J+1}$.

Step 40: Set the candidate point $P_{J+1}$ (i) in a position with a distance of Ln, $\Delta\theta = \delta \cdot i$ from $P_J$. i represents a quantized value of $\Delta\theta$ to be (2m+1) positive and negative integers around zero having $-m, \ldots, -1, 0, 1, \ldots, m$.

Step 41: Calculate a distance $D_i$ from each candidate point $P_{J+1}$ (i) to the closest point of the original road shape and an error $\Delta\Theta_i$ between the intercept azimuth of the closest point and that of the candidate point $P_{J-1}$ (i).

Step 42: Calculate an evaluation value $\epsilon_i$ for each candidate point $P_{J+1}$ (i) by the following equation.

$$\epsilon_i = \alpha \cdot (\delta \cdot |i|) + \beta \cdot D_i + \gamma \cdot |\Delta\Theta_i| + \Psi$$

$\alpha$, $\beta$, $\gamma$: a predetermined coefficient
$\Psi$: a penalty value to be set if an allowable error range is exceeded Step 43: Employ a candidate point $P_{J+1}$ (i) having the smallest $\epsilon_i$ for the node $P_{J+1}$.

The evaluation value $\epsilon_i$ is a minimum with i=0 until $D_i$ and $\Delta\Theta_i$ are increased and the penalty value $\Psi$ is added thereto. Accordingly, the candidate point is employed such that $\Delta\theta$ is set to be zero.

Referring to the fraction of the section length $D_n$ of the section n, moreover, a processing is carried out in the following manner.

$L_n < L_{n+1}$: The section n is resampled by the distance $L_n$. If the remainder (fraction) of the section n is smaller than $L_n$, a section n+1 and preceding sections are resampled by $L_n$ such that a distance obtained by adding the fraction and a part of the section n+1, and this point and subsequent points in the section n+1 are resampled by $L_{n+1}$.

$L_n > L_{n+1}$: The section n is resampled by the distance $L_n$. If the fraction of the section n is smaller than $L_n$, this point in the section n and the section n+1 are resampled by $L_{n+1}$.

Thus, a deterioration in precision can be prevented by resampling in a small section length.

If the minimum resolution $\delta°$ of $\Delta\theta$ is increased, the representation digit number of an angle is decreased and the shape following property of a circular arc is deteriorated so that a probability of $\Delta\theta=0$ is reduced and the coding and compressing effects are thereby deteriorated. To the contrary, if $\delta°$ is reduced, the representation digit number of the angle is increased and the shape following property of a circular arc is enhanced so that the probability of $\Delta\theta=0$ is increased and the coding and compressing effects are also enhanced. Moreover, the run-length compressing effects are also enhanced. In consideration of such a respect, it is necessary to determine the minimum resolution $\delta°$ of $\Delta\theta$ which is to be used actually.

Next, description will be given to the coding of data in this case.

A predicted value difference $\Delta\theta$ of a corresponding node is coded such that a data length is reduced around $\Delta\theta=0$.

A run-length of $\Delta\theta=0$ is coded because most of continuous data are data on $\Delta\theta=0$.

Moreover, a section length change code indicative of the change point of a resample section length is set. A special code is allocated to the section length change code and the section length is defined by fixed bits (approximately 3 bits) provided immediately after the special code.

Furthermore, a reference point set code indicative of the identification code of a reference point node in each section is set A special code is allocated to the reference point set code, fixed bits (approximately 6 bits) provided immediately after the special code are set to be reference node numbers and coordinates appearing after the reference node numbers are defined as reference nodes (a node number initial value is predetermined without an overhead bit and it is also possible to use a node number architecture for adding one every time the code is found).

Moreover, a special code is allocated as an EOD (End of Data) code indicative of the end of data. By the code, the end of a shape data string representation is set.

FIG. 19 illustrates a code table to be used for the coding.

Figure 20:
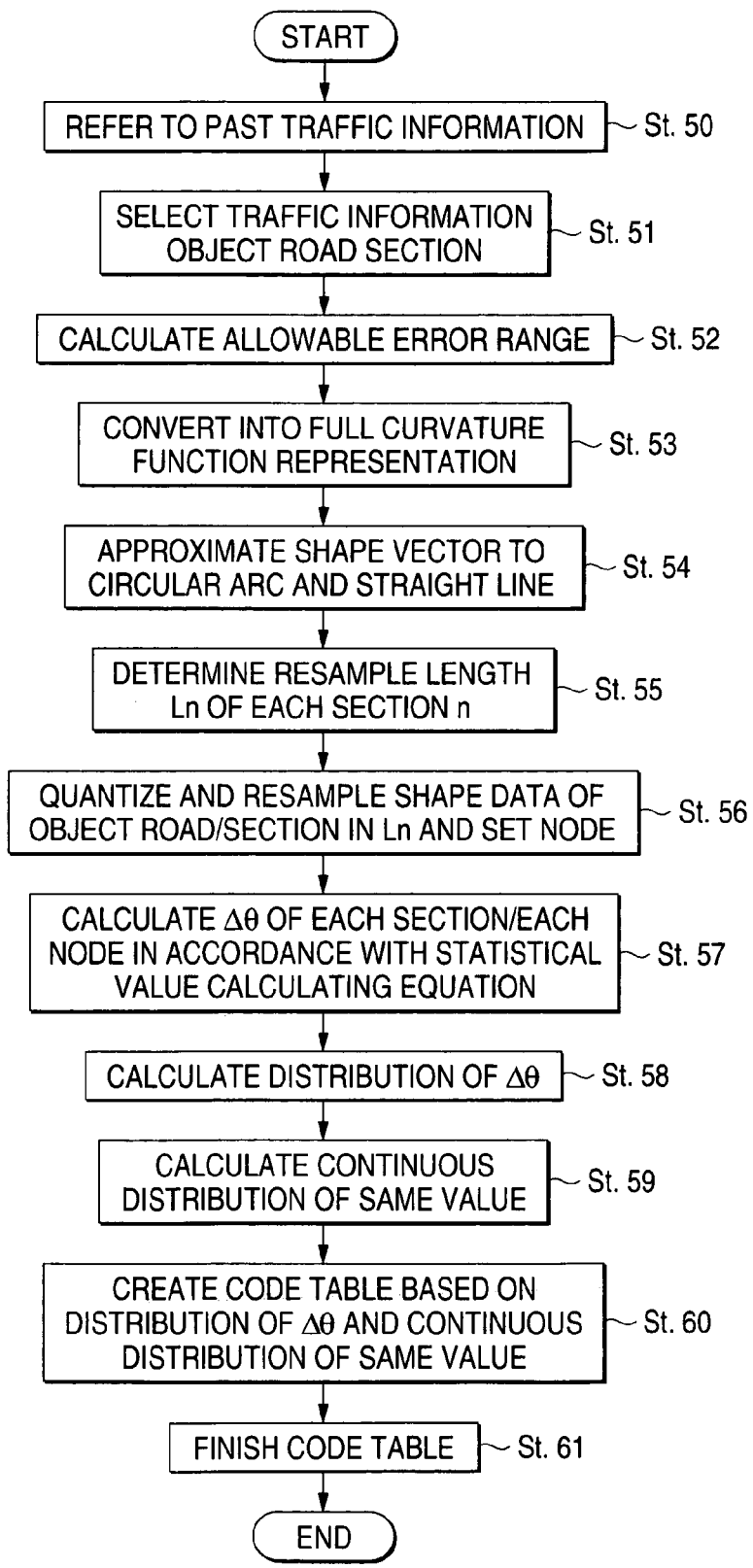
FIG. 20 is a flow chart showing a code table creating procedure in the coding method according to the fourth embodiment.
Figure 21:
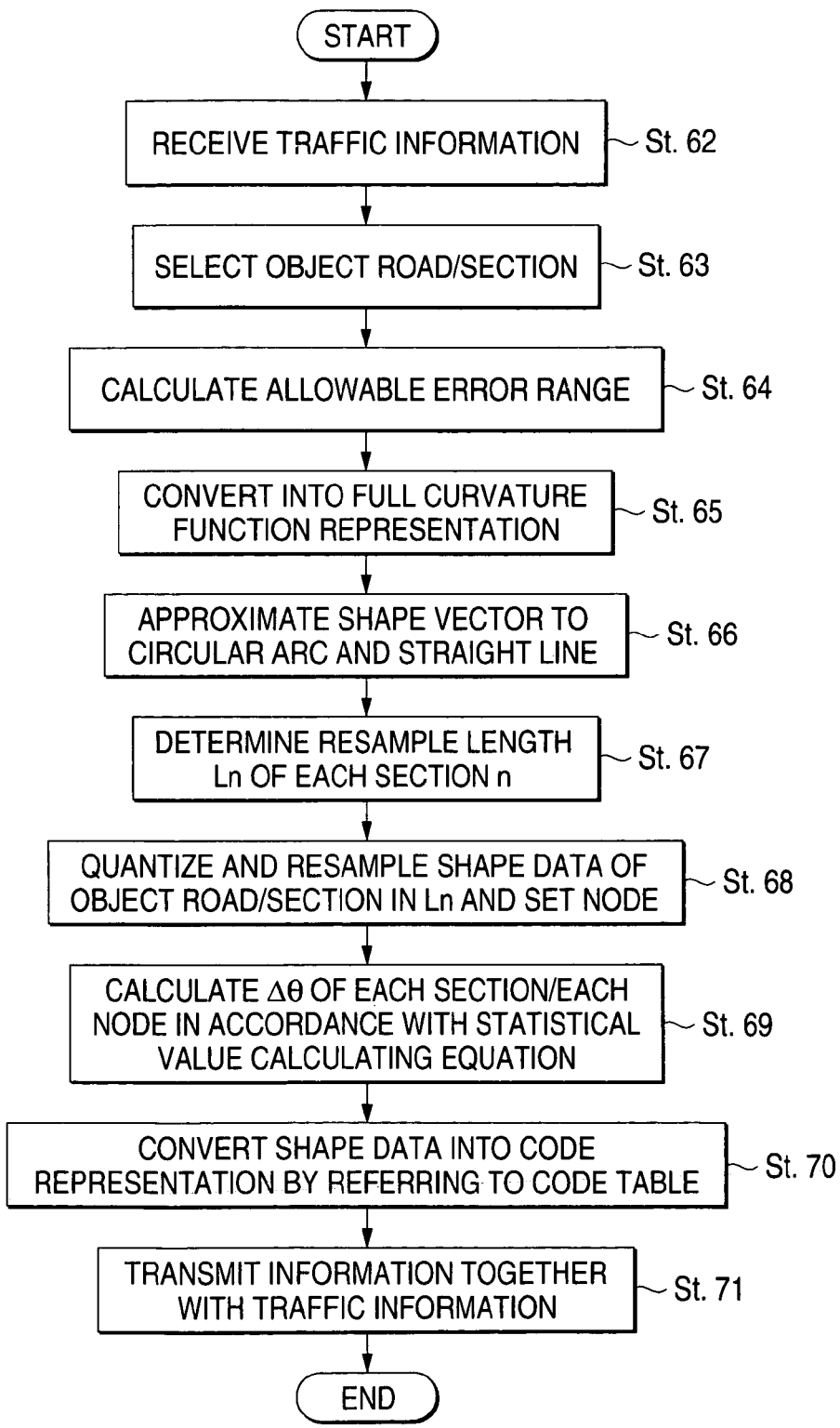
FIG. 21 is a flow chart showing a shape data creating procedure in the coding method according to the fourth embodiment.

Furthermore, FIG. 20 shows a procedure for creating the code table in an offline, and FIG. 21 shows a procedure for transmitting traffic information in an online by using the code table. In FIG. 20, Step 50: Refer to past traffic information.
Step 51: Select the object road section of the traffic information.
Step 52: Calculate an allowable error range along the object road section.
Step 53: Convert the node of the object road section into a full curvature function representation.
Step 54: Approximate the shape vector of the object road section to a circular arc and a straight line.
Step 55: Determine a resample length $L_n$ of each section n approximating the circular arc or the straight line.
Step 56: Quantize and resample shape data on the object road section by $L_n$ and set a node.
Step 57: Calculate $\Delta\theta$ of each section/each node in accordance with a statistical value calculating equation.
Step 58: Calculate an occurrence distribution of $\Delta\theta$.
Step 59: Calculate the continuous distribution of the same value.
Step 60: Create a code table based on the occurrence distribution of $\Delta\theta$ and the continuous distribution of the same value.
Step 61: Store the finished code table in a code table data base 24.

Moreover, the online processing in FIG. 21 is carried out in the following manner.

Step 62: Receive the traffic information from the event information input portion 11.
Step 63: Select an object road section including the position of generation of a traffic event.
Step 64: Calculate an allowable error range along the object road section.

Step 65: Convert the node of the object road section into a full curvature function representation.

Step 66: Approximate the shape vector of the object road section to a circular arc and a straight line.

Step 67: Determine a resample length $L_n$ of each section n approximating to the circular arc or the straight line.

Step 68: Quantize and resample shape data on the object road section by $L_n$ and set a node.

Step 69: Calculate $\Delta\theta$ of each section/each node in accordance with a statistical value calculating equation.

Step 70: Convert the shape data into a code representation by referring to the code table.

Step 71: Transmit the shape data on the coded object road section together with the traffic information.

While there has been described the example in which only the data on the code table created in the offline processing are utilized in the online processing, it is also possible to previously generate and store the shape data of each road section in which each road shape of an object region is represented by a code in the offline processing, to select the coded road shape data of the road section including the traffic event generation position from the shape data generated in the offline processing when inputting the information about the generation of a traffic event in the online processing, to generate traffic information representing the traffic event generation position by the relative position of the road section, and to transmit, to the receiving side, the coded road shape data thus selected and the traffic information thus generated as described in the third embodiment. Thus, the resample result in the fixed length L for the road shape which is executed in the offline can also be utilized in the online processing.

FIG. 22 shows the road shape data to be transmitted. The data include code table data and the coded shape data, and include data such as $\Delta\theta$, the reference node of each section and a sample section length as the coded shape data.

Figure 23:
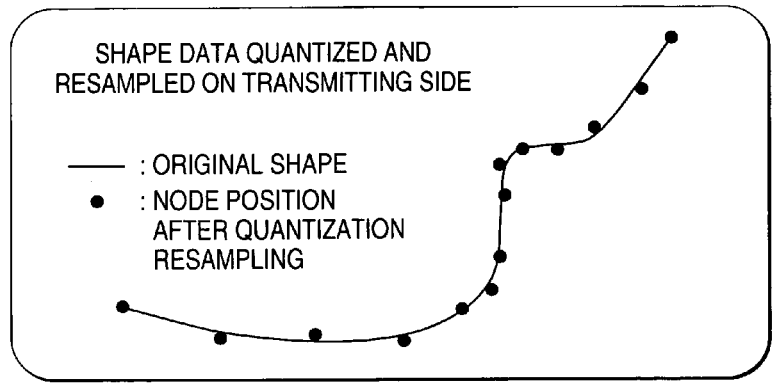
Figure 23:
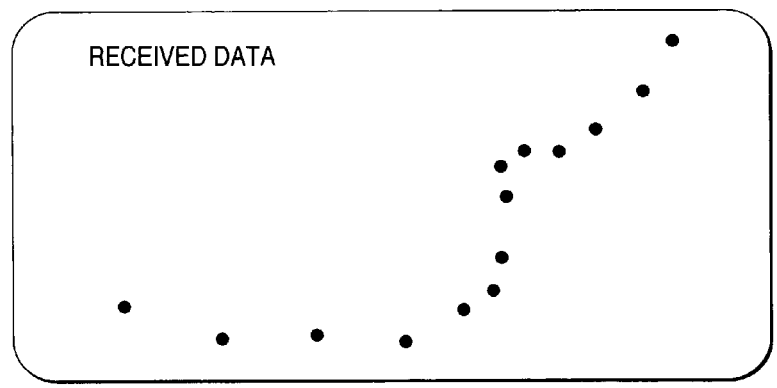
Figure 23:
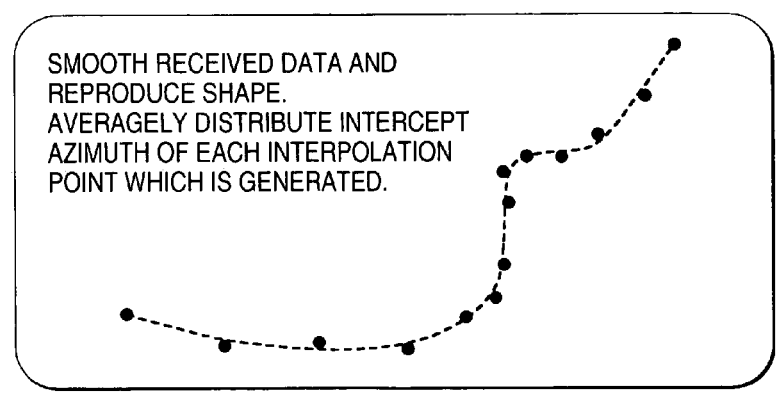

FIG. 23(a), (b), and (c) typically show data to be exchanged between transmission and receipt. On the transmitting side, a node position after the quantization and resampling is calculated to represent the road shape as shown in FIG. 23(a) and data indicative of the node position are transmitted to the receiving side as shown in FIG. 23(b). The receiving side smoothens the received data and reproduces a shape as shown in FIG. 23(c). In this case, an interpolation based on a B spline (an interpolation curve such as a Beziers spline or a Beziers curve is available) or smoothing based on a smoothing function can be carried out. Moreover, the intercept azimuth of each interpolation point which is generated is also distributed averagely.

FIG. 24 shows the procedure of the receiving side.

Step 80: Receive position information.

Step 81: Convert the shape data of a code representation into a full curvature function by referring to a code table.

Step 82: Next, carry out a conversion into latitude and longitude coordinates and a smoothing and interpolation processing to reproduce the shape data.

Step 83: Acquire a reference node position.

Step 84: Carry out map matching to specify an object road section.

Step 85: Reproduce the traffic information.

Thus, the shape data are highly compressed by using the irreversible compressing method described in the embodiment so that the volume of data to be transmitted can be reduced considerably.

The circular arc and straight line approximation of the shape data represented by the full curvature function can also be carried out simultaneously with the quantization resampling except that the shape is approximated in advance as described above.

The decision logic of the resample section length and the procedure for determining the quantization resampling which have been described above can also be applied to the case in which the shape data are not approximated to the circular arc.

Fifth Embodiment

In a fifth embodiment, description will be given to a method of coding road shape data without using the resample of a coordinate point.

As described above with reference to FIG. 41, a coordinate point ($P_J$) arranged on a road can be uniquely specified by two dimensions of a distance from an adjacent coordinate point ($P_{J-1}$) and an angle. In the first to fourth embodiments, the position of the coordinate point is resampled such that the distance becomes constant, and only the angle is coded to reduce the volume of data to be transmitted. In this case, however, a resample processing is required.

On the other hand, in the case in which road shape data are to be coded by exactly using, for the coordinate point, a node and an interpolation point which are included in the road shape of a digital map, the resample processing is not required. In this case, the distance of the node or the interpolation point is not constant. Therefore, it is necessary to code the angle and the distance.

FIG. 25 shows a method of coding both the angle and the distance. The coding of the angle is the same as that in the first embodiment, and angle information of each node (including an interpolation point) $P_J$ is represented by a predicted value difference $\Delta\theta_j$ to be a difference between a deviation angle $\theta_j$ and a deviation angle statistical predicted value $S_j$, $\Delta\theta_j$ is quantized in a unit of 1° (another resolution such as a unit of 2° may be used), for example, and a code table for $\Delta\theta$ is created based on the frequency of generation of the quantized $\Delta\theta_j$. At this time, the deviation angle statistical predicted value $S_j$ is defined as $S_j=\theta_{j-1}$ or $S_j=(\theta_{j-1}+\theta_{j-2})/2$, for example.

FIG. 26(b) shows an example of the code table for $\Delta\theta$ thus created. The table is the same as the code table (FIG. 2) according to the first embodiment. By using the code table for $\Delta\theta$, the angle information ($\Delta\theta_j$) of each node is viable-length coded.

On the other hand, the distance is coded in the following manner.

First of all, the distance information of each node $P_J$ is represented by a predicted value difference $\Delta L_j$ ($=L_j-T_j$) to be a difference between a distance $L_j$ to an adjacent node $P_{J+1}$ and a distance statistical predicted value $T_j$, and $\Delta L_j$ is quantized in a unit of 10 m (another resolution such as a unit of 50 m or 100 m may be used), for example. At this time, the distance statistical predicted value $T_j$ is defined as $T_j=L_{j-1}$ or $T_j=(L_{j-1}+L_{j-2})/2$, for example.

Next, a code table for $\Delta L$ is created based on the frequency of generation of the quantized $\Delta L_j$. FIG. 26(a) shows an example of the code table for $\Delta L$ thus created. The overhead bit of the code table is to be added for representing the positive or negative sign of $\Delta L$. When $\Delta L \neq 0$ is set, 0 is added if $\Delta L$ is positive, and 1 is added if $\Delta L$ is negative. Accordingly, if $T_j=L_{j-1}$ is defined,
when $L_j$ is greater than $L_{j-1}$ ($L_j-L_{j-1}>0$), 0 is added, and
when $L_j$ is smaller than $L_{j-1}$ ($L_j-L_{j-1}<0$), 1 is added.

By using the code table for $\Delta L$, the distance information ($\Delta L_j$) of each node is variable-length coded.

The order of a data array for coding the distance and angle is predetermined as $\Delta L_j \rightarrow \Delta \theta_j \rightarrow \Delta L_{j+1} \rightarrow \Delta \theta_{j+1} \rightarrow \ldots$. When an array of $\Delta L$–$\Delta \theta$ is set to "0·0__0·0__0·-2__+2·-2__0·+3__-5·0__0·0__0·+6", the data string is variable-length coded by using the code tables of FIGS. 26(a) and (b) in the following manner.

0·0__0·0__0·1011__1010·1011__0·11000__11101·0__0·0__0·111100"→

"00000101110101011011000111010000111100" (38 bits).

If a distance component is represented by a fixed length of 8 bits and an angle component is represented by a fixed length of 10 bits, (8 bits+10 bits)×8 nodes=144 bits are required so that a data volume can be compressed to 26% by the variable-length coding.

Figure 27:
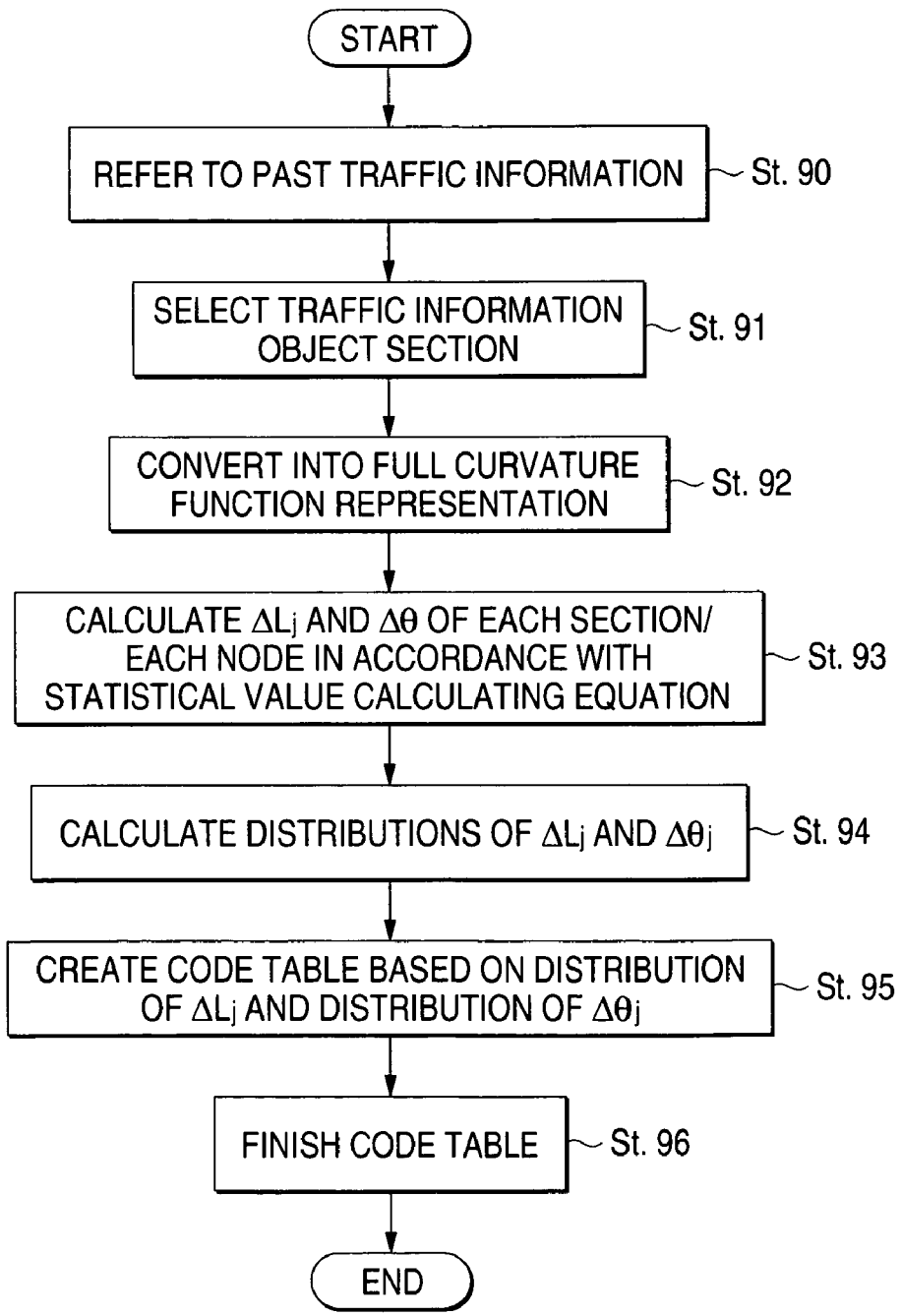
FIG. 27 is a flow chart showing a code table creating procedure in the coding method according to the fifth embodiment.

FIG. 27 shows a processing procedure for creating these code tables in an offline. With reference to past traffic information (Step 90), first of all, the object road section of the traffic information is selected (Step 91). Position data on a node included in the object road section are converted into a full curvature function representation (Step 92) and $\Delta L_j$ and $\Delta \theta_j$ in each node of each section are calculated in accordance with a statistical value calculating equation (Step 93). Next, the occurrence distributions of $\Delta L_j$ and $\Delta \theta_j$ are calculated (Step 94) and a code table for $\Delta L$ is created based on the occurrence distribution of $\Delta L_j$, and furthermore, a code table for $\Delta \theta$ is created based on the occurrence distribution of $\Delta \theta_j$ (Steps 95 and 96).

Moreover, FIG. 28 shows a processing procedure for coding road shape data by using the created code table in order to transmit the traffic information. When the traffic information is received (Step 97), an object road section including the position of generation of a traffic event is selected (Step 98). Position data on a node included in the object road section are converted into a full curvature function representation (Step 99), and $\Delta L_j$ and $\Delta \theta_j$ in each node of each section are calculated in accordance with a statistical value calculating equation (Step 100). Next, $\Delta L_j$ and $\Delta \theta_j$ in each node are converted into a code representation by referring to the code table data of the code table created to be intended for the object road section (or a code table created to be intended for a road taking a shape approximating the object road section) (Step 101). Shape data on the object road section thus coded are transmitted together with data on an event position represented by relative information in the object road section (step 102).

FIG. 29 and FIG. 30 show road shape data (FIG. 29) and event position data (FIG. 30) which are to be transmitted. The road shape data include code table data, the absolute coordinates of a start node p1 of a section (nodes p1 and p2) to be represented by a code, the absolute azimuth of the node p1, a distance L from the node p1 to a next node, and coded data between the nodes p1 and p2 (a bit string having $\Delta L_j$ and $\Delta \theta_j$ coded).

On the receiving side where the data are received, the data represented by a code are converted into a full curvature function by referring to the code table, thereby reproducing road shape data in the same manner as in a processing flow of FIG. 11. Next, map matching of the reproduced shape and the road shape of a self-digital map is executed to specify an object road section and to specify a traffic event generation position in the object road section from the event position data.

In the method according to the embodiment, thus, the coordinate point is not resampled but both data on the angle and distance for specifying the coordinate point are variable-length coded so that the transmission data volume of the road shape data can be reduced.

Sixth Embodiment

In a sixth embodiment, description will be given to a method of resampling the position of a coordinate point to cause an angle component to be constant on a road, thereby coding only a distance component.

As described above with reference to FIG. 41, a coordinate point ($P_j$) arranged on a road can be uniquely specified by two dimensions of a distance from an adjacent coordinate point ($P_{j-1}$) and an angle. In the first to fourth embodiments, the position of the coordinate point is resampled to cause the distance of the two dimensions to be constant, thereby coding only the angle to reduce the volume of data to be transmitted. To the contrary, the position of the coordinate point is resampled to cause the angle to be constant, thereby coding only the distance to reduce the volume of data to be transmitted in the sixth embodiment.

Figures 31, 32:
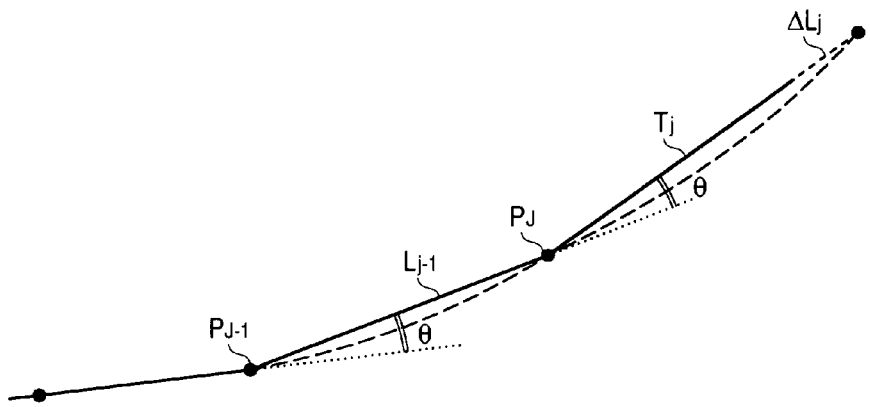
FIG. 31 is a diagram showing a node position, a distance and angle information in the case in which a coding method according to a sixth embodiment is applied.
FIG. 32 is a code table to be used in the coding method according to the sixth embodiment.

FIG. 31 shows a resample coordinate point in the case in which angle information is fixed (deviation angle $\theta$=constant) and distance information is coded. A processing of resampling the shape data is carried out in the following manner.

(1) Tracing is carried out over the road shape from a start node $P_0$ toward an end node and a next node $P_1$ is set into a position in which a deviation angle reaches a predetermined angle $\theta$ (or $-\theta$).

(2) When the tracing is carried out in the (1) and a distance from the start node $P_0$ reaches a predetermined distance $L_{max}$ before the deviation angle reaches $\theta$ (or $-\theta$), a next node $P_1$ is set into that position.

(3) By setting the node $P_1$ determined in the (1) or (2) to be a start edge, the rules of the (1) and (2) are applied to determine a next node $P_2$ and this processing is sequentially repeated to determine $P_3, \ldots, P_j, \ldots$.

Distance information in each node $P_j$ which is resampled is represented by a predicted value difference $\Delta L_j$ ($=L_j-T_j$) to be a difference between a distance $L_j$ to an adjacent node $P_{j+1}$ and a distance statistical predicted value $T_j$, and $\Delta L_j$ is quantized in a unit of 10 m (another resolution such as a unit of 50 m or 100 m may be used), for example. At this time, the distance statistical predicted value $T_j$ is defined as $T_j=L_{j-1}$ or $T_j=(L_{j-1}+L_{j-2})/2$, for example.

Next, a code table for $\Delta L$ is created based on the frequency of generation of the quantized $\Delta L_j$. At this time, a continuous distribution of $\Delta L_j$ may be calculated to create a code table incorporating run-length coding.

FIG. 32 shows an example of the code table for $\Delta L$ thus created. In the code table, it is defined that one bit for representing the positive or negative sign of the deviation angle $\theta$ (0 if $\theta$ is positive and 1 if $\theta$ is negative) is added as an overhead bit to a code when $\Delta L=0$ is set, and furthermore, it is defined that two bits having one bit for representing the positive or negative sign of the deviation angle $\theta$ and one bit (0 if $\Delta L$ is positive and 1 if $\Delta L$ is negative) for representing the positive or negative sign of $\Delta L$ are added as overhead bits to the code when $\Delta L \neq 0$ is set. Accordingly, in the case in which $T_j=L_{j-1}$ is defined, when $\Delta L \neq 0$ is set, if $L_j$ is greater than $L_{-1}$ ($L_j-L_{j-1}>0$), 0 is added as an overhead bit for representing the positive or negative sign of $\Delta L$, and if $L_j$ is smaller than $L_{j-1}$ ($L_j-L_{j-1}<0$), 1 is added as the overhead bit for representing the positive or negative sign of $\Delta L$, and furthermore, if an azimuth of $P_{j-1} \rightarrow P_j$ is provided on the left side of an azimuth of $P_{j-2} \rightarrow P_{j-1}$, (left curve), 0 is added as the overhead bit for representing the positive or negative sign of θ, and if the azimuth of Pj–1→Pj is provided on the right side of the azimuth of Pj–2→Pj–1 (right curve), 1 is added as the overhead bit for representing the positive or negative sign of θ.

In the fourth embodiment, the description has been given to the example in which the distance component (resample section length) is changed depending on the section in the case in which the coordinate point is resampled to cause the distance component to be constant. Also in the case in which the resampling is carried out to cause the angle component to be constant, it is also possible to change the value of θ depending on the section. In this case, the value of θ in each section can be identified by using a special code over a code converted shape data string in the same manner as in the fourth embodiment.

Figure 33:
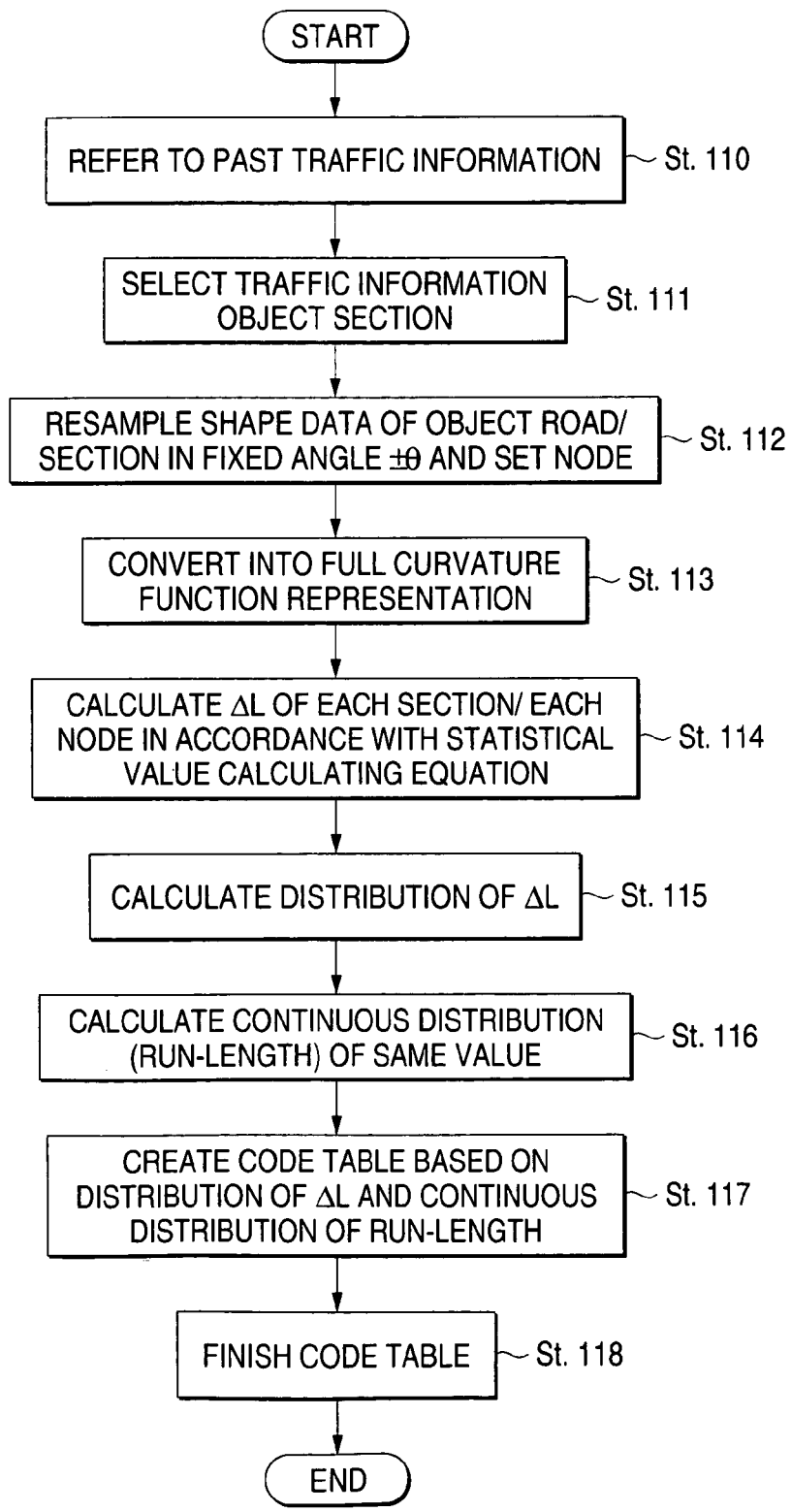
FIG. 33 is a flow chart showing a code table creating procedure in the coding method according to the sixth embodiment.
Figure 34:
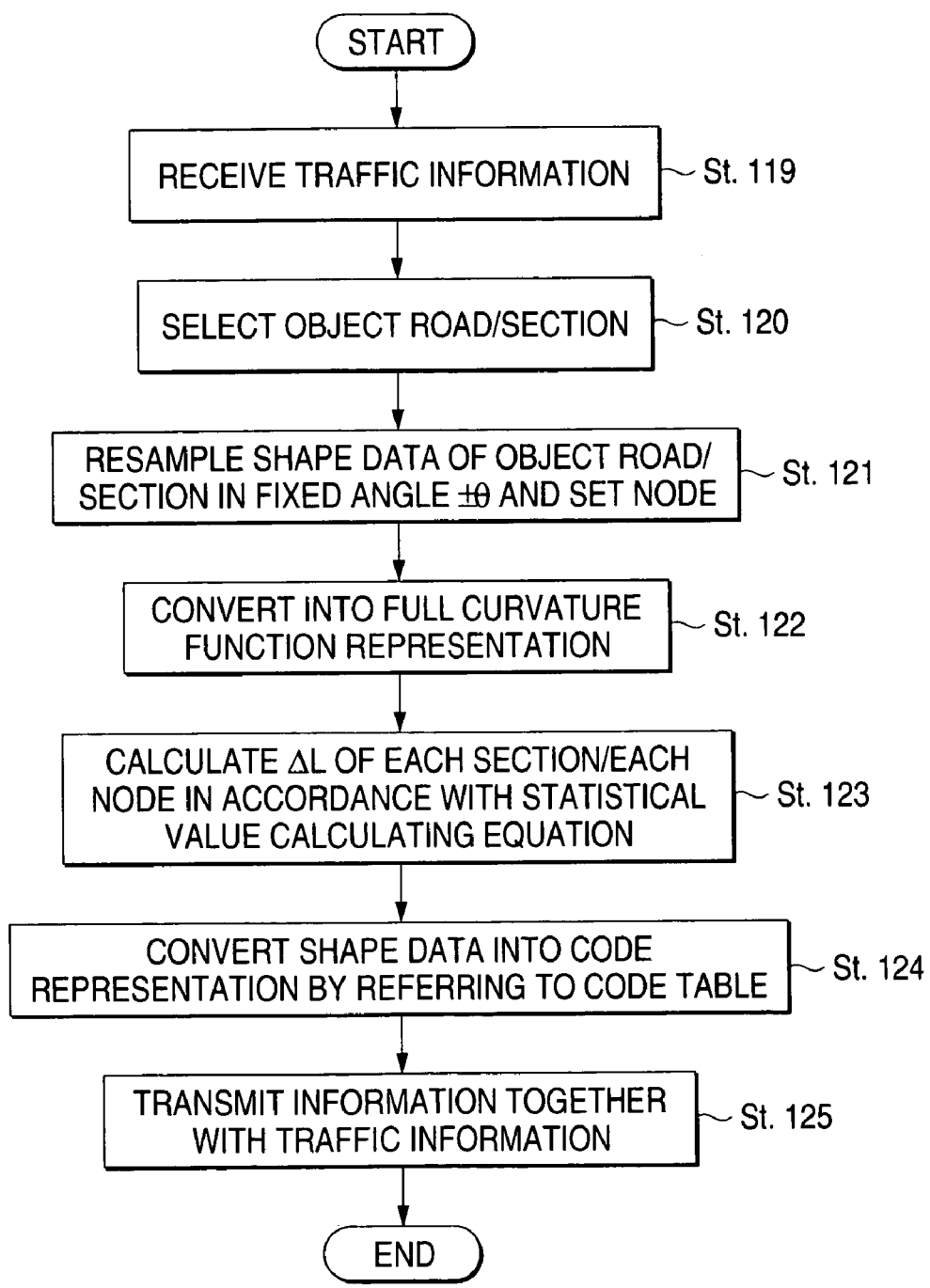
FIG. 34 is a flow chart showing a shape data creating procedure in the coding method according to the sixth embodiment.

FIG. 33 shows a processing procedure for creating the code table in an offline. Moreover, FIG. 34 shows a processing procedure for coding road shape data by using the code table thus created and transmitting traffic information. These procedures are different from the procedure described in the third embodiment (FIG. 7 and FIG. 8) in that the shape data on an object road section are resampled with a fixed angle θ (or –θ) in place of a fixed length L (Step 112, Step 121), ΔL is calculated in place of Δθ of each node which is resampled (Step 114, Step 123) and a code table for ΔL is created based on a distribution of ΔL in place of a code table for Δθ based on the distribution of Δθ (Step 115, Step 117), and other procedures are identical.

Moreover, FIG. 35 shows road shape data to be transmitted. The road shape data are different from the road shape data described in the third embodiment (FIG. 9) in that they include information about a sample angle θ in place of a sample section length L, and furthermore, include a bit string having $\Delta L_j$ coded as the coded data in place of a bit string having $\Delta \theta_j$ coded, and other respects are identical.

On the receiving side where the data are received, data represented by a code are converted into a full curvature function with reference to a code table to reproduce the road shape data in the same manner as in the processing flow of FIG. 11. Next, map matching with the reproduced shape and the road shape of a self-digital map is executed to specify an object road section and to specify a traffic event generation position in the object road section from event position data.

In the method according to the embodiment, thus, the position of the coordinate point is resampled to cause the angle component to be constant over a road and only the distance component is variable-length coded so that the transmission data volume of the road shape data can be reduced.

Seventh Embodiment

In a coding method according to a seventh embodiment, a representation based on a deviation angle or a representation based on a predicted value difference can be selected as a method of representing angle information in order to convert the shape of a road into shape data having a statistical deviation.

As described above with reference to FIG. 42, in the case in which any of the representation based on the deviation angle $\theta_j$ (FIGS. 42(b) and (b')) and a representation based on the predicted value difference $\Delta \theta_j$ of the deviation angle $\theta_j$ (FIGS. 42(c) and (c')) is employed for the angle information of a coordinate point, road shape data can be converted into data having a statistical deviation about zero.

If the statistical deviation is greater, the effect of reducing a data volume based on variable-length coding is increased. In comparison of the case in which the angle information of the coordinate point is represented by the deviation angle $\theta_j$ with the case in which the same angle information is represented by the predicted value difference $\Delta \theta_j$ of the deviation angle $\theta_j$, the latter case generally provides a greater statistical deviation.

Figure 36:
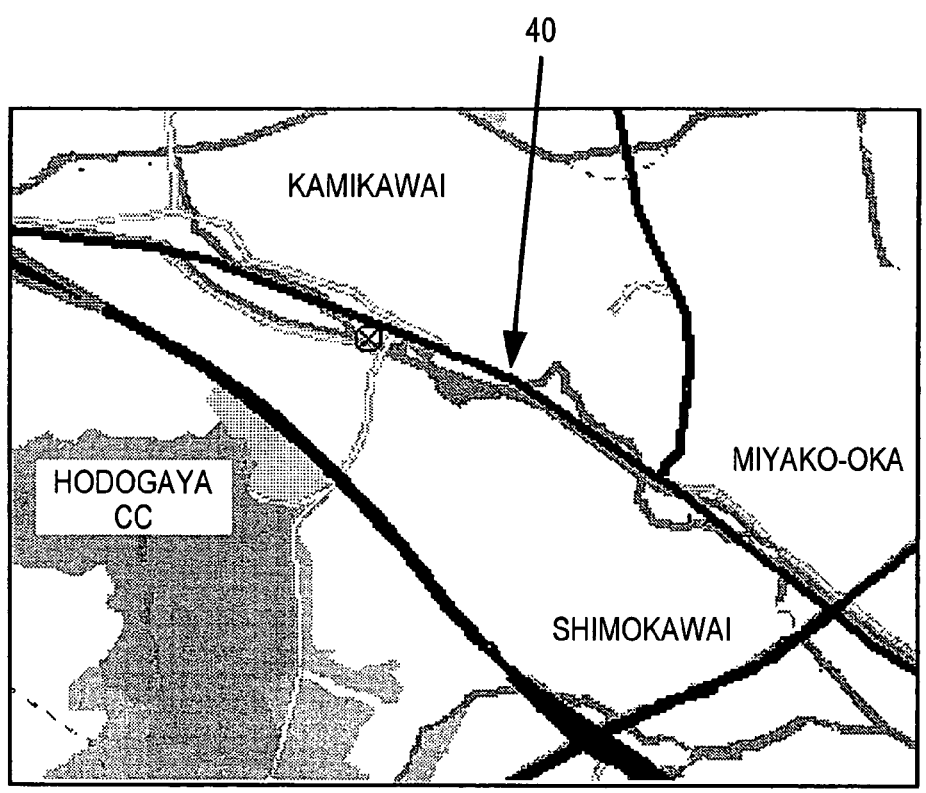
FIG. 36 is a view showing the shape of a road which is suitable for applying a coding method according to a seventh embodiment.

As shown in FIG. 36, however, if the angle information is represented by the predicted value difference $\Delta \theta_j$ of the deviation angle in a road 40 having a straight line provided between curves for a while, $0, \ldots, 0, \theta_1, -\theta_1, 0, \ldots, 0, \theta_2, -\theta_2, 0, \ldots$ is set, and if the angle information is represented by the deviation angle è, $0, \ldots, 0, \theta_1, 0, 0, \ldots, 0, \theta_2, 0, 0, \ldots$ is set. In the case in which the angle information of the coordinate point is represented by the deviation angle $\theta_j$, it can have a greater statistical deviation as compared with the case in which the angle information of the coordinate point is represented by the predicted value difference $\Delta \theta_j$.

In some cases, thus, it is preferable that the angle information of the coordinate point resampled with a constant distance L should be represented by the deviation angle $\theta_j$ to be suitable for viable-length coding depending on the shape of the road.

In the method according to the embodiment, a data size obtained by representing the shape of the road by the deviation angle θ to carry out the variable-length coding is compared with a data size obtained by representing the shape of the road by the predicted value difference Δθ of the deviation angle to carry out the variable-length coding to transmit coded data having the smaller data size.

First of all, there are created a deviation angle θ code table for representing the shape of the road by the deviation angle $\theta_j$ to carry out the variable-length coding and a Δθ code table for representing the shape of the road by the predicted value difference $\Delta \theta_j$ of the deviation angle $\theta_j$ to carry out the variable-length coding.

Figure 37:
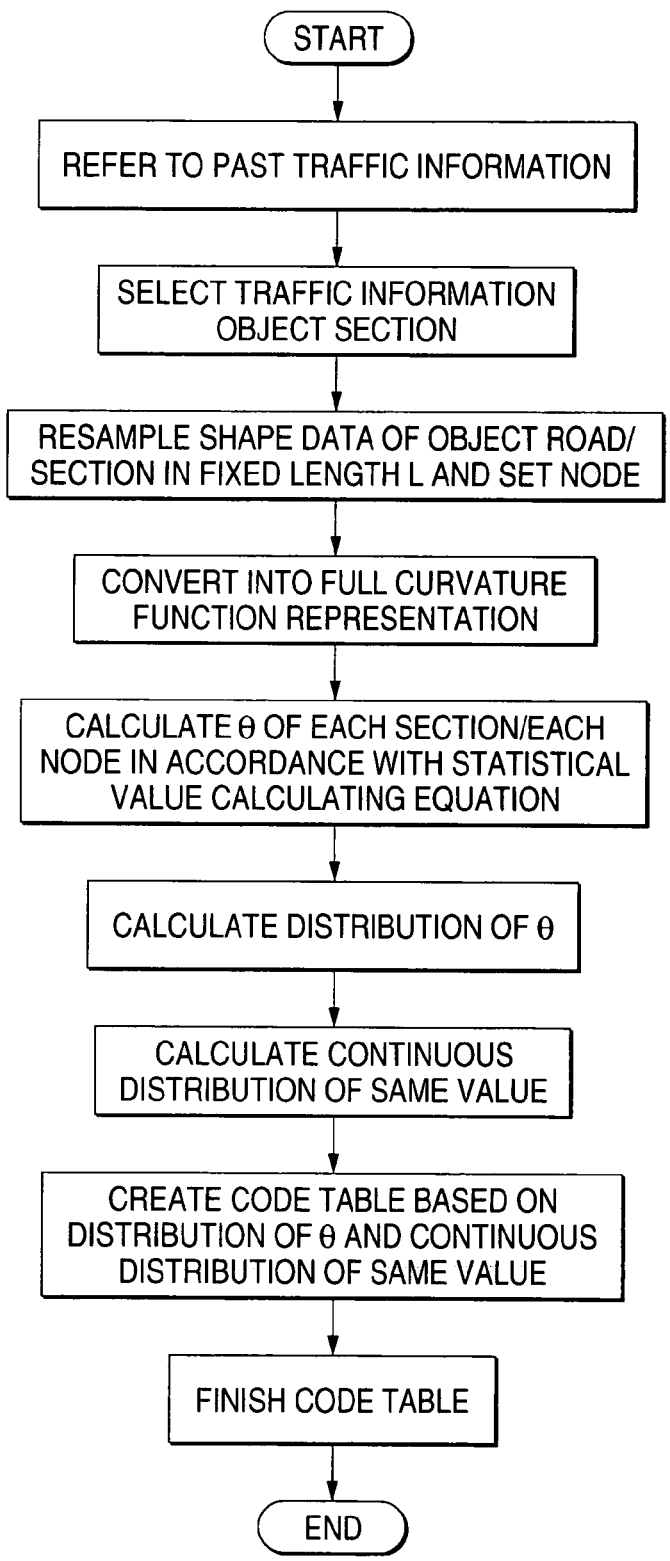
FIG. 37 is a flow chart showing a $\theta$ code table creating procedure in the coding method according to the seventh embodiment.
Figure 38:
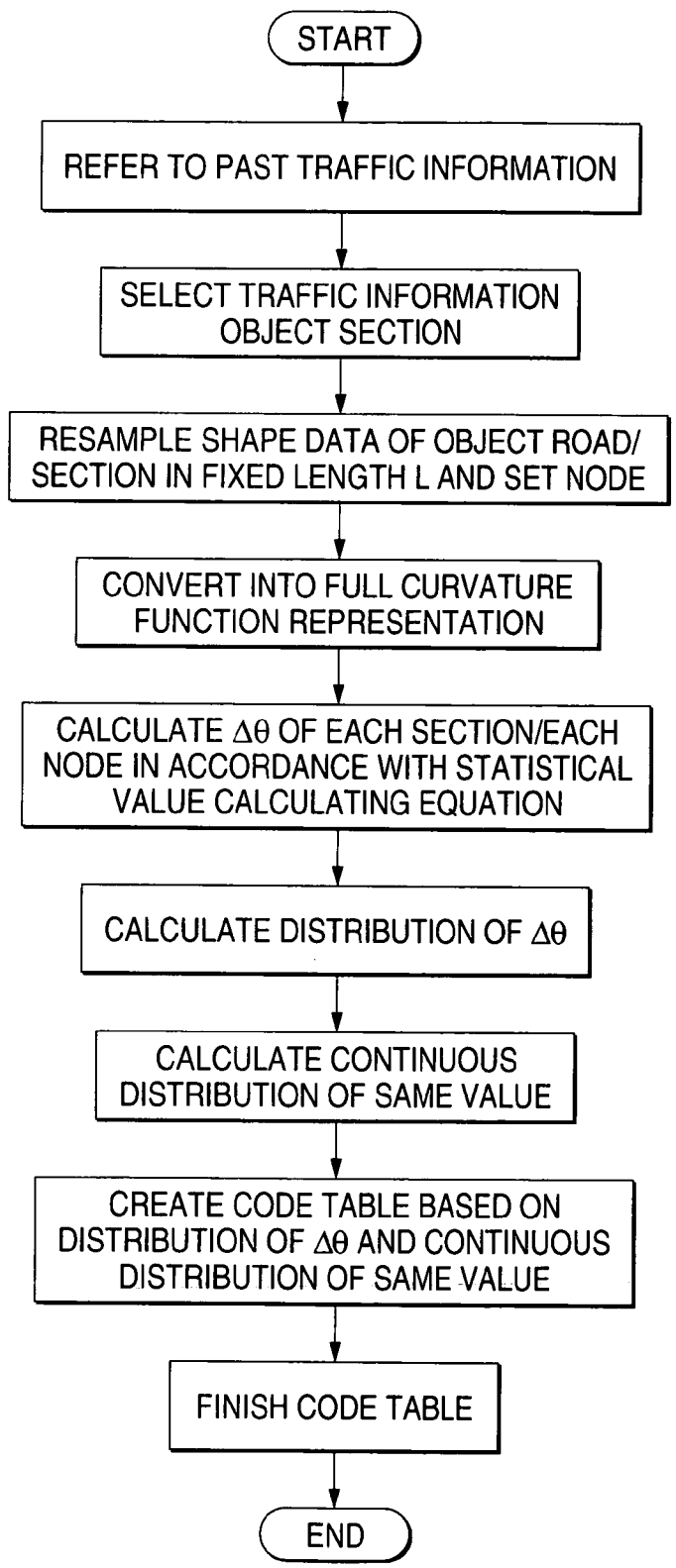
FIG. 38 is a flow chart showing a $\Delta\theta$ code table creating procedure in the coding method according to the seventh embodiment.

FIG. 37 shows a procedure for creating a deviation angle θ code table and FIG. 38 shows a procedure for creating a Δθ code table. The procedure shown in FIG. 38 is the same as the procedure (FIG. 7) in the third embodiment. Moreover, the procedure shown in FIG. 37 is different in that the deviation angle θ is used in place of Δθ in the procedure shown in FIG. 38.

Figure 39:
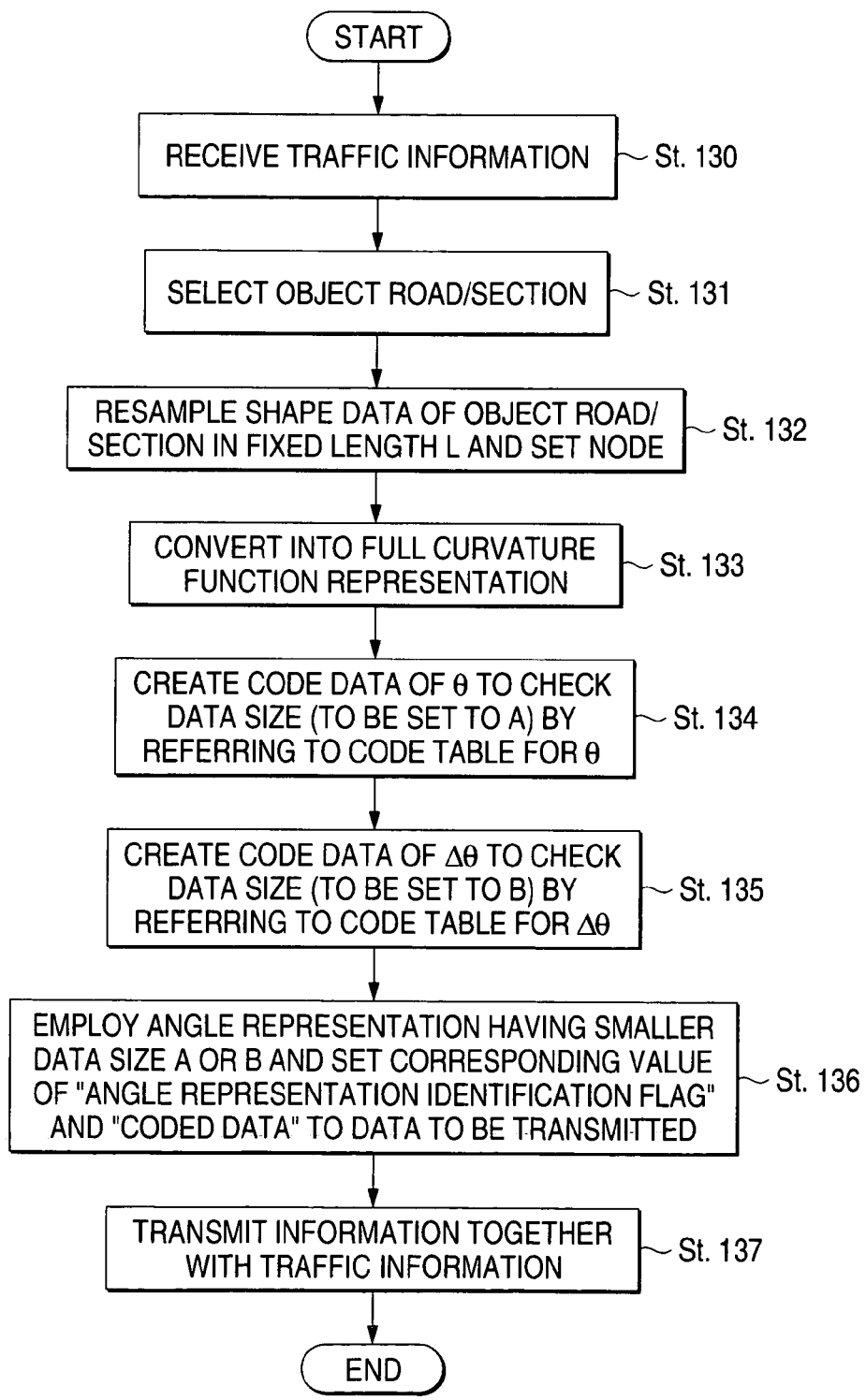
FIG. 39 is a flow chart showing a shape data creating procedure in the coding method according to the seventh embodiment.

FIG. 39 shows a processing procedure for coding road shape data and transmitting traffic information by using these code tables created in offline.

Step 130: Receive traffic information.

Step 131: Select an object road section including the position of generation of a traffic event.

Step 132: Resample the road shape data of the object road section in a fixed length L and set a node.

Step 133: Convert the position data of the set node into a full curvature function representation.

Step 134: Next, create code data on θ by referring to a code table for θ and calculate a data size (A).

Step 135: Next, create code data on Δθ by referring to a code table for Δθ and calculate a data size (B).

Step 136: Compare the data size (A) with the data size (B), employ an angle representation of the smaller data size and set, to shape data to be transmitted, a value of an "angle representation identification flag" indicative of the angle representation thus employed and "coded data" in the employed angle representation.

Step 137: Transmit the shape data on the coded object road section together with data on an event position expressed in the relative information of the object road section.

FIG. 40 shows the road shape data to be transmitted. The road shape data include information about the "angle representation identification flag" indicative of the employed angle representation (0 when a representation based on the deviation angle θ is employed, and 1 when a representation based on the predicted value difference Δθ is employed) and information about the "coded data" in the employed angle representation.

On the receiving side where the data are received, θ or Δθ is reconstituted from the "coded data" represented by a code with reference to the code table based on information designated by the "angle representation identification flag", thereby converting position data on each node into a full curvature function Subsequent processings are the same as those in the third embodiment, and the road shape data are reproduced, map matching of the reproduced shape and the road shape of a self-digital map is executed to specify an object road section and to specify a traffic event generation position in the object road section from event position data.

In the method according to the embodiment, thus, any of the representation based on the deviation angle or the representation based on the predicted value difference is selected as the method of representing angle information. Consequently, the volume of data to be transmitted can be reduced still more.

The coding method according to the invention can also be applied to the compression of a map data body. Moreover, the method can also be applied to the transfer of map data over an internet (for example, a client-server type map display system using a vector map) or a map data delivery service.

Also in the case in which running locus data are to be transmitted to a center for an urgent report sent from the onboard machine of a vehicle or floating car data (FCD), moreover, the data can be compressed by using the coding method.

Also in the case in which a vector shape is to be compressed in a spline compressing method and is to be transmitted as data on each node string, furthermore, data compression can be carried out over the representation of the node string by using the code table with the application of the coding method according to the invention.

Moreover, the coding method according to the invention can also be applied to the case in which the shape data of a region (polygon) on a digital map are to be transmitted. For example, in the case in which the polygon is to be designated to transmit a weather report in the region, the shape data of a border line on the polygon shape are transmitted so that the receiving side can specify the polygon. In the case in which the shape data of the border line are to be transmitted, the transmission data volume can be compressed by applying the coding method according to the invention. At this time, in the case in which it is not necessary to precisely specify the polygon shape as in the region in which the weather report is applied, the receiving side can omit a matching processing with the shape on the digital map.

The illustrated code table is only an example and is not always optimum. Actually, it is necessary to check the distribution of the variable ($\theta_j$, $\Delta\theta_j$, $L_j$), thereby creating a code table by using the Huffman tree.

For the coding technique, there are various methods such as a fixed character compressing method, a run-length method, a Shannon-Fano coding method, a Huffman coding method, an adaptive type Huffman coding method, an arithmetic coding method and a dictionary method (LHA method). In this specification, it is also possible to use these coding methods While the description has been given to the case in which the code table is generated in an offline, the coding can be carried out in an online by using the adaptive type Huffman coding method or the arithmetic coding method.

While only certain embodiments of the invention have been specifically described herein, it will be apparent that numerous modifications may be made thereto without departing from the spirit and scope of the invention.

The present invention is based on Japanese Patent Applications No. 2001-134318 filed on May 1, 2001 and No. 2001-220061 filed on Jul. 19, 2002, which are incorporated herein by references.

INDUSTRIAL APPLICABILITY

As is apparent from the above description, in the coding method according to the invention, the data volume of the vector shape on the digital map can be compressed efficiently. In the position information transmitting method and device according to the invention, consequently, it is possible to considerably decrease the transmission data volume in the case in which the vector shape of the digital map is to be transmitted. On the receiving side, the shape data are reconstituted from the received data and the map matching is carried out so that the vector shape thus transmitted can be specified accurately.

The invention claimed is:

1. A shape data coding method of coding data representing a shape representing geometric information, the method comprising the steps of:
   representing the shape using a node string, wherein each node of the node string is represented by position information having at least two elements;
   converting one of the elements of the position information about each node of the node string to provide converted data so that the converted data pools about a predetermined value more than the others of the elements of the position information; and
   coding the converted data.

2. A receiver for receiving, from a transmitter, shape data coded according to the method of claim 1.

3. A transmitter for transmitting, to a receiving side, shape data coded according to the method of claim 1.

* * * * *